United States Patent
Luthe et al.

(10) Patent No.: US 12,040,675 B2
(45) Date of Patent: Jul. 16, 2024

(54) METHOD FOR DRIVING A ROTOR OF A PLANAR DRIVE SYSTEM

(71) Applicant: Beckhoff Automation GmbH, Verl (DE)

(72) Inventors: Thomas Luthe, Verl (DE); Hubertus Pennekamp, Gütersloh (DE); Eva Wiedner, Hövelhof (DE); Tobias Weber, Verl (DE); Klaus Neumann, Gütersloh (DE); Alexander Weddemann, Lippstadt (DE)

(73) Assignee: Beckhoff Automation GmbH, Verl (DE)

( * ) Notice: Subject to any disclaimer, the term of this patent is extended or adjusted under 35 U.S.C. 154(b) by 498 days.

(21) Appl. No.: 17/328,259

(22) Filed: May 24, 2021

(65) Prior Publication Data

US 2021/0328493 A1    Oct. 21, 2021

Related U.S. Application Data

(63) Continuation of application No. PCT/EP2019/082515, filed on Nov. 26, 2019.

(30) Foreign Application Priority Data

Nov. 26, 2018 (DE) ...................... 10 2018 129 731.9

(51) Int. Cl.
*H02K 41/03* (2006.01)
(52) U.S. Cl.
CPC ....... *H02K 41/031* (2013.01); *H02K 2201/18* (2013.01); *H02K 2213/03* (2013.01)
(58) Field of Classification Search
CPC combination set(s) only.
See application file for complete search history.

(56) References Cited

U.S. PATENT DOCUMENTS

| 6,097,114 | A | 8/2000 | Hazelton |
| 6,316,849 | B1 | 11/2001 | Trumper et al. |

(Continued)

FOREIGN PATENT DOCUMENTS

| CN | 1330807 A | 1/2002 |
| CN | 101537932 A | 9/2009 |

(Continued)

OTHER PUBLICATIONS

Office Action dated Dec. 24, 2021 in connection with Chinese patent application No. 201980077844.7, 10 pages including English translation.

(Continued)

*Primary Examiner* — Christopher M Koehler
*Assistant Examiner* — Viswanathan Subramanian
(74) *Attorney, Agent, or Firm* — Dorsey & Whitney LLP

(57) ABSTRACT

A method for driving at least one rotor in a planar drive system. The rotor has a device for generating a magnetic field. The rotor can be moved on a drive surface formed by stator modules comprising a magnetic field generator. A virtual two-dimensional potential curve is determined for the rotor, with a target point having an attractive potential. A virtual force vector is determined with a vector direction and a vector length at a first position of the rotor, which is determined from the virtual two-dimensional potential curve. A magnetic drive field interacting with the magnetic field of the rotor is generated by the magnetic field generator such that a resulting force is applied to the rotor by interaction of the magnetic drive field with the magnetic field. The direction of the resulting force is based on the vector direction, and the strength is based on the vector length.

19 Claims, 14 Drawing Sheets

(56) References Cited

U.S. PATENT DOCUMENTS

| | | | |
|---|---|---|---|
| 6,339,266 | B1 | 1/2002 | Tanaka |
| 6,417,914 | B1 | 7/2002 | Li |
| 6,835,941 | B1 | 12/2004 | Tanaka |
| 7,339,289 | B2 | 3/2008 | Wang et al. |
| 8,281,888 | B2 | 10/2012 | Bergmann |
| 9,187,268 | B2 | 11/2015 | Denninger et al. |
| 9,202,719 | B2 | 12/2015 | Lu et al. |
| 9,701,487 | B2 | 7/2017 | Unterseher |
| 10,222,237 | B2 | 3/2019 | Lu |
| 10,352,953 | B2 | 7/2019 | Huber et al. |
| 10,370,195 | B2 | 8/2019 | Huber |
| 10,509,049 | B2 | 12/2019 | Sinz et al. |
| 10,669,049 | B2 | 6/2020 | Eberhardt et al. |
| 10,763,733 | B2 | 9/2020 | Lu |
| 11,855,557 | B2 | 12/2023 | Luthe et al. |
| 2005/0107909 | A1 | 5/2005 | Wynblatt et al. |
| 2008/0051984 | A1* | 2/2008 | Wurman ............ G05D 3/00 |
| | | | 701/532 |
| 2011/0093134 | A1 | 4/2011 | Emanuel et al. |
| 2017/0163140 | A1 | 6/2017 | Lu |
| 2017/0179805 | A1 | 6/2017 | Lu |
| 2017/0179806 | A1 | 6/2017 | Lu |
| 2017/0217460 | A1 | 8/2017 | Huber et al. |
| 2017/0344009 | A1* | 11/2017 | Wernersbach ....... G05D 1/0297 |
| 2017/0361731 | A1 | 12/2017 | Cromheecke et al. |
| 2018/0102681 | A1 | 4/2018 | Prüssmeier |
| 2018/0217174 | A1* | 8/2018 | Malinowski ....... G01R 19/2513 |
| 2018/0373255 | A1 | 12/2018 | Wernersbach |
| 2020/0223645 | A1 | 7/2020 | Feyrer |
| 2021/0273592 | A1 | 9/2021 | Luthe et al. |
| 2021/0273593 | A1 | 9/2021 | Luthe et al. |
| 2021/0278863 | A1 | 9/2021 | Luthe et al. |
| 2021/0281203 | A1 | 9/2021 | Luthe et al. |

FOREIGN PATENT DOCUMENTS

| | | |
|---|---|---|
| CN | 101779368 A | 7/2010 |
| CN | 103135640 A | 6/2013 |
| CN | 103891114 A | 6/2014 |
| CN | 104094507 A | 10/2014 |
| CN | 105307960 A | 2/2016 |
| CN | 105452812 A | 3/2016 |
| CN | 105600469 A | 5/2016 |
| CN | 106168627 A | 11/2016 |
| CN | 106716141 A | 5/2017 |
| CN | 107852082 A | 3/2018 |
| DE | 102009008529 A1 | 9/2010 |
| DE | 102006007623 B4 | 6/2015 |
| DE | 102015209610 A1 | 12/2016 |
| DE | 102017131304 A1 | 6/2019 |
| DE | 102017131314 A1 | 6/2019 |
| DE | 102017131321 A1 | 6/2019 |
| DE | 102018129727 A1 | 5/2020 |
| DE | 102018129731 A1 | 5/2020 |
| DE | 102018129732 A1 | 5/2020 |
| DE | 102018129738 A1 | 5/2020 |
| DE | 102018129739 A1 | 5/2020 |
| EP | 2047376 B1 | 8/2015 |
| EP | 3095739 A1 | 11/2016 |
| EP | 3096144 A1 | 11/2016 |
| EP | 3385803 A1 | 10/2018 |
| EP | 3868005 B1 | 6/2022 |
| JP | H03112393 A | 5/1991 |
| JP | 2000125536 A | 4/2000 |
| WO | 2013059934 A1 | 5/2013 |
| WO | 2013064656 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2016012157 A1 | 1/2016 |
| WO | 2016012160 A1 | 1/2016 |
| WO | 2016012171 A1 | 1/2016 |
| WO | 2017004716 A1 | 1/2017 |
| WO | 2018176137 A1 | 10/2018 |
| WO | 2019170488 A1 | 9/2019 |
| WO | 2020109168 A1 | 6/2020 |
| WO | 2020109180 A1 | 6/2020 |
| WO | 2020109274 A1 | 6/2020 |
| WO | 2020109276 A1 | 6/2020 |
| WO | 2020109287 A1 | 6/2020 |

OTHER PUBLICATIONS

Office Action dated Dec. 14, 2021 in connection with Chinese patent application No. 201980077609X, 19 pages Including English translation.

"Flying Motion: XPlanar," Beckhoff New Automation Technology, Nov. 1, 2018, Seiten 1-28. https://www.beckhoff.com/media/downloads/informationsmedien/beckhoff_xplanar_e.pdf.

International Search Report and Written Opinion in connection with PCT/EP2019/082536 dated Jun. 4, 2020, 25 pages including English translation.

International Search Report and Written Opinion dated Jun. 4, 2020 in connection with International Patent Application No. PCT/EP2019/082298, 25 pages including English translation.

International Search Report and Written Opinion dated Jun. 4, 2020 in connection with International Patent Application No. PCT/EP2019/082515, 29 pages including English translation.

International Search Report and Written Opinion dated Jun. 4, 2020 in connection with International Patent Application No. PCT/EP2019/082518, 25 pages including English translation.

International Search Report and Written Opinion dated Jun. 4, 2021 in connection with International Patent Application No. PCT/EP2019/082257, 25 pages including English translation.

Amato et al. "A Randomized Roadmap Method for Path and Manipulation Planning," IEEE, Apr. 1996, 8 pages.

Bortoff, Scott A. "Path Planning for UAVs" Proceedings of hte American Control Conference, Jun. 2000, 5 pages.

Bounini et al. "Modified Artificial Potential Field Method for Online Path Planning Applications," IEEE Intelligent Vehicles Symposium, Jun. 11, 2017, 7 pages.

Carbone et al. "Motion and Operation Planning of Robotic Systems: Background and Practical Approaches," Jan. 2015, 42 pages.

Correll, Nikolaus. "Introduction to Autonomous Robots," V1.7, Oct. 6, 2016, 10 pages.

Gasparetto et al. "Path Planning and Trajectory Planning Algorithms: A General Overview," 2015, 26 pages.

Gayle, et al. "Reactive deformation roadmaps: motion planning of multiple robots in dynamic environments." Proceedings of the 2007 IEEE/RSJ International Conference on Intelligent Robots and Systems, Oct. 29-Nov. 2, 2007, S. 3777-3787.

Kavraki et al. "Probabilistic Roadmaps for Path Planning in High-Dimensional Configuration Spaces," IEEE, vol. 12, No. 4, Aug. 1996, 15 pages.

Kim, et al. "Probabilistic Vehicle Trajectory Prediction over 1 Recurrent Neural Network," arxiv.org, Cornell University Library, 201 Olin Library Cor 14853, Apr. 24, 2017.

Le-Anh, et al. "A review of design and control of automated guided vehicle systems," European Journal of Operational Research, 171 (2006), pp. 1-23.

Nieuwenhuisen et al. "Local Multiresolution Path Planning in Soccer Games Based on Projected Intentions," Mar. 2012, 32 pages.

Padilla Cataneda et al. "Local Autonomous Robot Navigation using Potential Fields," Jun. 1, 2008, 25 pages.

Petereit et al. "Application of Hybrid A* to an Autonomous Mobile Robot for Path Planning in Unstructured Outdoor Environments," 2012.

Röfer et al. RoboCup 2011: Robot Soccer World Cup XV, Mar. 2012, 24 pages.

Tommasino et al. "Feel the Painting': a Clinician-Friendly Approach to Programming Planar Force Fields for Haptic Devices," IEEE, 2015, 6 pages.

Trumper et al. "Design and Analysis Framework for Linear Permanent Magnet Machines," IEEE, 1994, 8 pages.

(56) References Cited

OTHER PUBLICATIONS

Velagapudi et al. "Decentralized prioritized planning in large multirobot teams," 2010 IEEE/RSJ International Conference on Intelligent Robots and Systems, Oct. 18, 2010, 7 pages.
Warren, Charles. "Multiple Robot Path Coordination Using Artificial Potential Fields," IEEE Conference on Robotics and Automation, May 13, 1990, 8 pages.
Zhang et al. "Probabilistic Roadmap with Self-learning for Path Planning of a Mobile Robot in a Dynamic and Unstructured Environment," IEEE, Aug. 4, 2013, 6 pages.
Office Action dated Nov. 29, 2021 in connection with Chinese Patent Application No. 201980077558.3, 10 pages including English translation.
Notification of an Objection received in connection with European patent application No. 19817165.4, dated Mar. 7, 2023, 41 pages including English translation.
Enze, Jiang et al. "Analysis of Current Distribution for Permanent Magnet Synchronous Planar Motors," Proceedings of the CSEE, vol. 31, No. 9, Mar. 25, 2011, 5 pages.
Kim, Won-jong et al. "Modeling and Vector Control of Planar Magnetic Levitator," IEEE, vol. 34, No. 6, Nov. 1998, 9 pages.
Office Action dated Jan. 6, 2022 in connection with Chinese patent application No. 201980077654.5, 7 pages including English translation.
Translation of Chinese Publication No. CN103135640A.

\* cited by examiner

METHOD FOR DRIVING A ROTOR OF A PLANAR DRIVE SYSTEM

CROSS-REFERENCE TO RELATED APPLICATIONS

This application is a continuation of International Patent Application PCT/EP2019/082515, filed 26 Nov. 2019, "Method for Driving a Rotor of a Planar Drive System," which claims the priority of German patent application DE 10 2018 129 731.9, filed 26 Nov. 2018, "Verfahren zum Antreiben eines Läufers eines Planarantriebssystems," each of which is incorporated by reference herein, in the entirety and for all purposes.

FIELD

The present invention relates to a method for driving a rotor of a planar drive system. Furthermore, the invention relates to a planar drive system.

BACKGROUND

Planar drive systems may be used in automation technology, in particular in manufacturing technology, handling technology and process engineering. Planar drive systems may be used to move or position a moving element, referred to as rotor, of a system of a machine in at least two linearly independent directions. Planar drive systems may comprise a permanently energized electromagnetic planar motor with a planar stator and a rotor movable on the stator in at least two directions.

In a permanently energized electromagnetic planar motor, a driving force is exerted onto the rotor by current-carrying conductors generating a magnetic drive field which interacts magnetically with a magnet arrangement, in particular an arrangement of permanent magnets, of the rotor. In particular, the invention relates to embodiments of planar drive systems in which the rotor has a static magnetic field while the conductor strips are associated with the stator. The magnetic drive field is thus provided by the stator.

EP 3 095 739 A1 discloses a device and a method for driving at least one rotor on a drive surface, wherein travel paths for the rotors are calculated. The calculation is performed by a graph-based algorithm, for example by a so-called A* algorithm or an algorithm derived from the A* algorithm. The use of the A* algorithm makes high demands on the memory provided for the calculation. The demands on the memory capacity increase with the complexity of a considered system.

SUMMARY

The invention provides an improved method for driving a rotor and an improved planar drive system.

According to one aspect, a method drives at least one rotor of a planar drive system, the rotor comprising at least a device for generating a magnetic field, in particular a magnet arrangement, the rotor being movable on a drive surface, the drive surface being formed by stator modules, the stator modules having a magnetic field generator. The method comprises determining a virtual two-dimensional potential curve for the rotor, wherein a target point of the rotor has an attractive potential within the virtual two-dimensional potential curve; determining a virtual force vector at a first position of the rotor, the virtual force vector resulting from the virtual two-dimensional potential curve, the virtual force vector having a vector direction and a vector length; and controlling the magnetic field generator to generate a magnetic drive field that interacts with the magnetic field of the rotor such that a resulting force is applied to the rotor by the interaction of the magnetic drive field with the magnetic field, wherein a direction of the resulting force is set based on the vector direction, and wherein a strength of the resulting force is set based on the vector length.

According to another aspect, a method for driving at least one rotor of a planar drive system, the rotor comprising at least a device for generating a magnetic field, in particular a magnet arrangement, the rotor being movable on a drive surface, the drive surface being formed by stator modules, the stator modules having a magnetic field generator. The method comprises determining a virtual two-dimensional potential curve for the rotor, wherein a target point of the rotor has an attractive potential within the virtual two-dimensional potential curve; determining a virtual force vector at a first position of the rotor, the virtual force vector resulting from the virtual two-dimensional potential curve, the virtual force vector having a vector direction and a vector length; and controlling the magnetic field generator to generate a magnetic drive field that interacts with the magnetic field of the rotor such that a resulting force is applied to the rotor by the interaction of the magnetic drive field with the magnetic field, wherein a direction of the resulting force is set based on the vector direction, and wherein a strength of the resulting force is set based on the vector length, wherein at least an obstacle has a repulsive potential within the virtual two-dimensional potential curve, wherein the obstacle is a further rotor, wherein the method is additionally carried out for the further rotor, wherein the repulsive potential of the rotors is different and the rotor with a higher priority has a higher potential, wherein the higher priority is measure of which rotor is to be preferably moved in the direction of its target point when moving the rotors across the drive surface.

According to another aspect, a planar drive system comprises a control unit, a plurality of stator modules and at least one rotor, wherein the stator modules comprise a magnetic field generator for generating a magnetic drive field. the rotor comprising at least a device for generating a magnetic field, in particular a magnet arrangement, the rotor being movable on a drive surface, the drive surface being formed by the stator modules, wherein the control unit is capable to control the magnetic field generator to generate a magnetic drive field that interacts with the magnetic field of the rotor such that a resulting force is applied to the rotor by the interaction of the magnetic drive field with the magnetic field, wherein a direction of the resulting force is set based on a vector direction, and wherein a strength of the resulting force is set based on a vector length.

EXAMPLES

In a method for driving at least one rotor of a planar drive system, the rotor comprises at least a device for generating a magnetic field. This device for generating a magnetic field may in particular comprise a magnet. The rotor is movable on a drive surface, the drive surface being formed by stator modules. The stator modules comprise magnetic field generators, for example in the form of conductor strips generating magnetic fields. The method comprises, as a first step, determining a virtual two-dimensional potential curve for the rotor, wherein a target point of the rotor has an attractive potential within the virtual two-dimensional potential curve.

In a second method step, a virtual force vector is determined at a first position of the rotor. The virtual force vector results from the virtual two-dimensional potential curve. The virtual force vector comprises a vector direction and a vector length. In a third method step, the magnetic field generator is controlled in such a way that a magnetic drive field is generated which interacts with the magnetic field of the rotor. The magnetic drive field is generated in such a way that a force resulting from the interaction of the magnetic drive field with the magnetic field of the rotor acts on the rotor. A direction of the resulting force is set based on the vector direction. A current strength for energizing is set on the basis of the vector length.

If the magnetic field generator is embodied in the form of conductor strips, the generation of the magnetic drive field is controlled by a control of a current supply to the conductor strips. Controlling the current supply comprises both the provision of information on a current intensity by which a controllable voltage source sets a current intensity and the provision of a current with a specific current intensity.

It may be provided to sum up different attracting and repelling potentials to determine the virtual two-dimensional potential curve. This may e.g. be done by assigning a potential value for each location to different virtual two-dimensional partial potentials and adding the potential values of the partial potentials for each location to a total potential value at this location, wherein the total potential values form the virtual two-dimensional potential curve.

It may be provided, as well, to use a virtual n-dimensional potential curve from which the virtual force vector results. Here, n may be more than two.

A control unit is embodied to execute the method according to the invention. For this purpose, the control unit has, in particular, a facility for exchanging data with a stator module, the stator module comprising the conductor strips for generating magnetic fields. In this case, an additional controller may be provided in the stator modules which uses the information provided by the control unit on a current strength to control the current flow to the conductor strips.

A planar drive system consists of such a control unit, a plurality of stator modules and at least one rotor. The stator modules comprise a magnetic field generator, e.g. in the form of conductor strips, for generating the magnetic drive field. However, other magnetic field generators within the stator modules are conceivable, as well.

A computer program includes commands that, when executed by a computer, cause the computer program to carry out the method.

By determining the virtual two-dimensional potential curve, a direction of movement may be calculated for each rotor on the basis of the virtual force vector, which is determined on the basis of the virtual two-dimensional potential curve, and thus a control of the magnetic field generator may be initialized, by which a magnetic drive field is generated, by which the rotor is moved as far as possible along the virtual force vector, so that a movement towards the target point may take place.

In an embodiment, obstacles on the drive surface taken into account by a repulsive potential so that movement toward the target point may be accomplished while bypassing the obstacles.

In another embodiment, the first position of the rotor is determined by sensors within stator modules. In another embodiment, a second position of the obstacle is determined by these sensors. In this case, it may be provided that the obstacle is another rotor. Typically, planar drive systems have sensors for determining the positions of the rotors. These determined positions may then be taken into account when determining the virtual two-dimensional potential curve. Static obstacles may also be taken into account based on a known position of the obstacle by sensors without determining the position.

In an embodiment, the method is additionally executed for the further rotor. The rotor for which the method is originally carried out may be considered as an obstacle with a repulsive potential for the additional rotor and may be taken into account when determining the virtual potential curve for the additional rotor. Thus, the method may be applied to a plurality of rotors within a planar drive system.

In an embodiment, the repelling potential of the rotors is different and the rotor having a higher priority has a higher potential. As a result, the rotor with the lower priority is repelled more strongly by the rotor with the higher priority than vice versa. As a result, when a plurality of rotors is driven simultaneously, the rotor with the higher priority is held more strongly on an ideal path than the rotor with the lower priority, wherein the ideal path is the path that would result if the respective other rotor were not present. The rotor with the lower priority, so to speak, avoids the rotor with the higher priority more than vice versa.

In another embodiment, the method is carried out again after a predetermined period of time has elapsed. In particular, the method may be repeated in predefinable time cycles. In this way, the rotor may be moved to the target point along a movement path determined in the respective method steps on the basis of the virtual force vectors.

In an embodiment of the method, the target point is changed when the method steps are carried out again. This is e.g. advantageous if the target point of the original method steps was an intermediate target point on the way to a final target point. It is then possible to switch to the final target point when the intermediate target point has been reached or even before the intermediate target point has been reached. This makes it possible to realize significantly more complex movement options.

In an embodiment, the virtual force vector is determined using a two-dimensional derivation of the virtual two-dimensional potential curve. This is a simple mathematical possibility of determining a virtual force vector from the virtual two-dimensional potential curve. In particular, a gradient of the virtual two-dimensional potential curve may be used for calculation.

In another embodiment, the stator modules each have four edges. The edges are either inner edges or outer edges. Further plate-shaped sectors adjoin on the inner edges, but not on the outer edges. The outer edges each have a repulsive potential, which is taken into account when determining the virtual two-dimensional potential curve.

If the drive surface is constructed from a plurality of stator modules, the rotors should be free to move over the inner edges where the stator modules adjoin each other. However, the rotors should preferably not move in the direction of the outer edges where no further stator modules adjoin, as otherwise there is a risk that the rotors will leave the drive surface. The repulsive potential at the outer edges may thus restrict and ideally completely prevent movement of the rotor away from the drive surface.

In an embodiment, potentials outside of a predetermined distance from the rotor are not taken into account when determining the virtual two-dimensional potential curve. This simplifies determining the two-dimensional potential curve and subsequently calculating the virtual force vector, since potentials that are further away and less relevant for the current step of movement are not considered.

In a further embodiment, the attractive potential of the target point is also taken into account if the target point lies outside of the specified distance. This makes it possible to drive the rotor in such a way that movement takes place in the direction of the target point even if it lies outside the specified distance.

In another embodiment, the target point is replaced by an intermediate target point if the target point is located further away from the rotor than the specified distance. The intermediate target point has an attractive potential. If the target point is outside of the specified distance, the attractive potential of the target point is no longer taken into account when determining the virtual force vector. In this case, it makes sense to use an intermediate target point to replace the target point. The intermediate target point may be located in an area between the rotor and the target point.

In an embodiment, when determining the virtual two-dimensional potential curve, a virtual compensation potential is taken into account in such a way that there are no local potential minima on a rotor path between the rotor and the target point. Thus, the target point itself has the only potential minimum in a region between the rotor and the target point. It is advantageous to exclude local potential minima on a rotor path, because otherwise, due to the virtual force vectors, a movement towards the local potential minima and not towards the target point will occur. Virtual compensation potentials may help to exclude such local potential minima on the rotor path and thus enable a movement towards the target point.

In another embodiment, a temperature of an area of a stator module, in particular a temperature of one stator module or a plurality of stator modules, is taken into account when determining the virtual two-dimensional potential curve. In this context, a repulsive potential may be assigned to areas of the drive surface, wherein the repulsive potential is the higher, the higher the temperature in the corresponding area is. In addition, temperature sensors may be provided to determine the temperature in the areas. As a result, areas of the drive surface that are heated due to a preceding generation of a drive force may be less frequented and thus cool down again.

In a further embodiment, a movement of a further rotor is predicted and a future further second position of the further rotor after carrying out the movement is also taken into account when determining the virtual two-dimensional potential curve. It may be provided in this context to consider different positions of the further rotor on the basis of a weighting in the virtual two-dimensional potential curve, wherein the points in time of the further rotor reaching the different positions may flow into the weighting.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The invention relates to further developments of the planar drive systems disclosed in the publications WO 2013/059934 A1, WO 2015/017933 A1, WO 2015/179962 A1, WO 2015/184553 A1, WO 2015/188281 A1 and WO 2017/004716 A1. The disclosure content of the aforementioned publications is also made the subject of the present description in its entirety by reference.

Furthermore, the invention relates to further developments of the planar drive systems disclosed in the German patent applications 10 2017 131 304.4, 10 2017 131 314.1, and 10 2017 131 321.4, filed with the DPMA on Dec. 27, 2017. The disclosure content of the German patent applications 10 2017 131 304.4, 10 2017 131 314.1, and 10 2017 131 321.4 is also made the subject matter of the present description in its entirety by reference.

Figure 1:
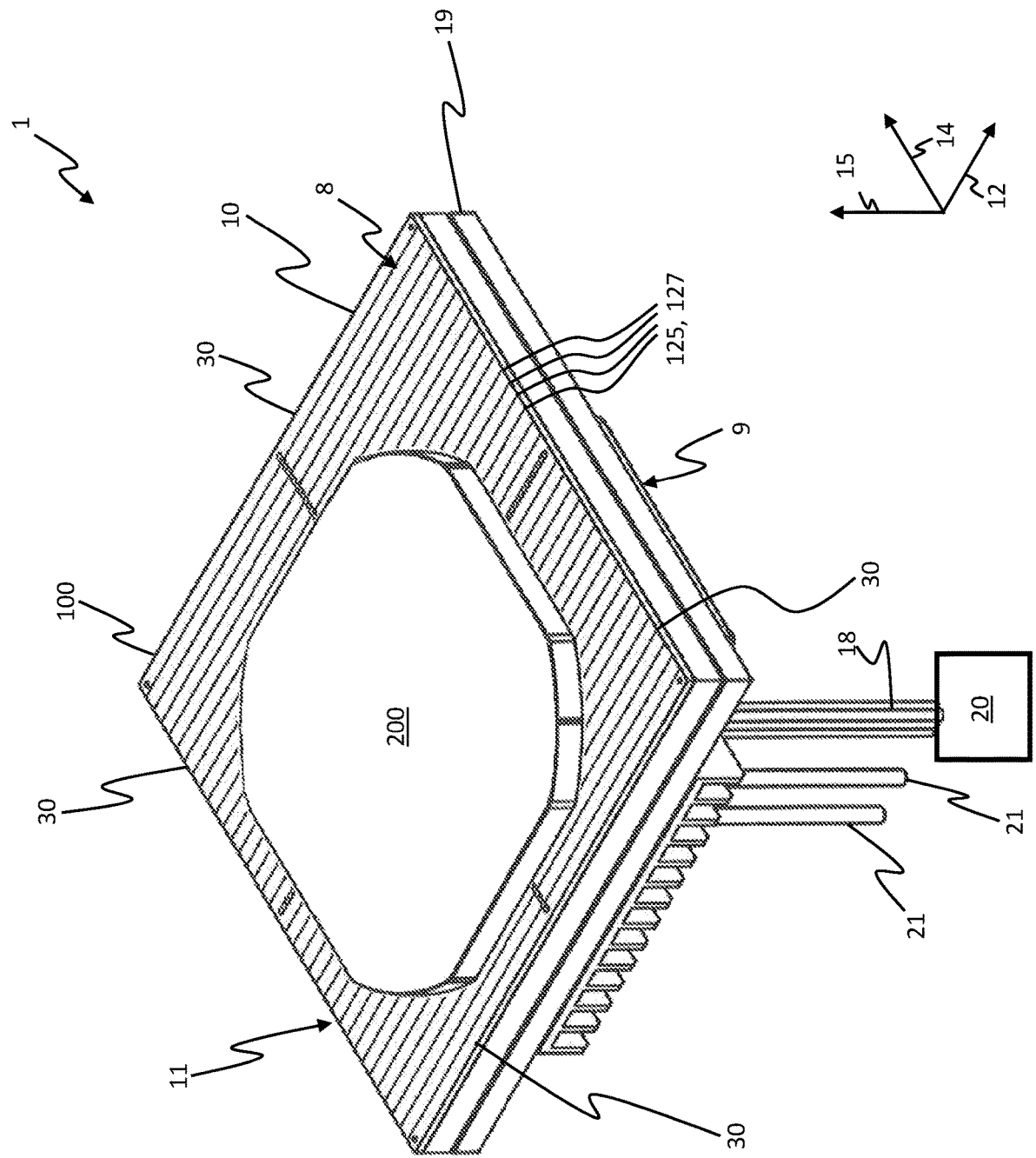
FIG. 1 shows a view of a planar drive system comprising a stator module, a control unit and a rotor.

FIG. 1 shows a planar drive system 1 comprising a rotor 200 and a stator module 10. The stator module 10 comprises a module housing 19 and a stator assembly 100. The stator module 10 has a top side 8 and a bottom side 9 opposite the top side 8. The stator assembly 100 is arranged in a vertical direction 15 oriented from the bottom side 9 to the top side 8 above the module housing 19 and at the top side 8 of the stator module 10. The stator assembly 100 is formed as a planar stator and has a flat, i.e. planar, stator surface 11 on the upper side 8 of the stator module 10. The stator surface 11 also forms a surface of the stator module 10.

The stator surface 11 is oriented perpendicular to a vertical direction 15 and extends across the entire top side 8 of the stator assembly 100 and of the stator module 10 along directions 12 and 14. The stator assembly 100 includes at least one conductor strip 125 on the stator surface 11, to which a drive current may be applied. As shown, the stator assembly 100 may include a plurality of the conductor strips 125 on the stator surface 11. A drive current may be applied to each of the conductor strips 125 by a control unit 20. With the drive currents in the conductor strips 125, a magnetic field may be generated that drives the rotor 200 in interaction with magnets of the rotor 200. The rotor 200 and the stator assembly 100 with the current-carrying conductor strips 125 form an electromagnetic planar motor. The conductor strips 125 form coil conductors of the stator assembly 100 and may also be referred to as coil conductors. The conductor strips 125 form a magnetic field generator 127.

During operation, the rotor 200 is movably arranged above the stator surface 11 of the stator module 10 and, when operated, may be driven in a first direction 12 as well as in a second direction 14. The first direction 12 and the second direction 14 are linearly independent. In particular, the first direction 12 and the second direction 14 may be oriented perpendicularly with regard to each other, as shown in FIG. 1. The first direction 12 and the second direction 14 are each oriented in parallel to the stator surface 11 and perpendicular to the vertical direction 15. By driving the rotor 200 in both the first direction 12 and the second direction 14, the rotor 200 may be driven in any direction above the stator surface 11. In operation, the rotor 200 may be held floating above the stator surface 11, e.g. by magnetic interaction between the drive magnets and suitable drive currents in the conductor strips 125. In addition to driving the rotor 200 in the first and/or second directions 12, 14, it is also possible to drive it in the third, vertical direction 15. Furthermore, the rotor 200 may also be rotated about its axis.

The stator surface 11 is rectangular in shape. In particular, the stator surface 11 may be square in shape, as shown. The stator surface 11 is limited by four respective straight outer edges 30. In each case, two mutually opposite outer edges 30 are oriented in parallel to the first direction 12 and two mutually opposite further outer edges 30 are oriented in parallel to the second direction 14.

An extension of the stator assembly 100 in the vertical direction 15 is smaller than an extension of the stator assembly 100 in the first and second directions 12, 14. Therefore, the stator assembly 100 forms a flat cuboid extending in the first and second directions 12, 14 or a plate extending in the first and second directions 12, 14.

Further components may be arranged at the module housing 19 or at the stator module 10 on the bottom side 9 of the stator module 10 or on the bottom side of the module housing 19. These further components extend at most to the outer edges 30 of the stator assembly 100 in the first direction 12 or in the second direction 14, so that the further components do not project beyond the outer edges 30 of the stator assembly 100 in the first or the second direction 12, 14.

Connections for connecting the stator module 10 to a plurality of connecting lines 18, 21 are arranged on the bottom side of the module housing 19. The connecting lines 18, 21 may e.g. comprise a data connection line 18 of a data network and a power supply line 21 for supplying electrical power to the stator module 10. The control unit 20 is connected to the data connection line 18. In particular, electrical power may be supplied to the stator module 10 via the power supply line 21 to generate the drive currents. The control unit 20 may be configured to actuate the drive currents in the conductor strips 125. This particularly means that with a control signal provided by the control unit 20 which is transmitted to the stator module 10 by the data connection line 18, the conductor strips 125 of the stator assembly 100 are, within the stator module 10, supplied with a current defined by the control signal.

In the first direction 12, the stator surface 11 may have an extension of between 100 mm and 500 mm, in particular between 120 mm and 350 mm, in particular of 240 mm. In the second direction 12, the stator surface 11 may have an extension of between 100 mm and 500 mm, in particular of between 120 mm and 350 mm, in particular of 240 mm. In the vertical direction 15, the stator module 10 may have an extension of between 10 mm and 100 mm, in particular of between 15 mm and 60 mm, in particular of 30 mm. In the vertical direction 15, the module housing 19 may have an extension of between 8 mm and 80 mm, in particular of between 13 mm and 55 mm, in particular of 26.6 mm. The module housing 19 may have the same extension in the first and/or second direction 12, 14 as the stator surface 11.

Figure 2:
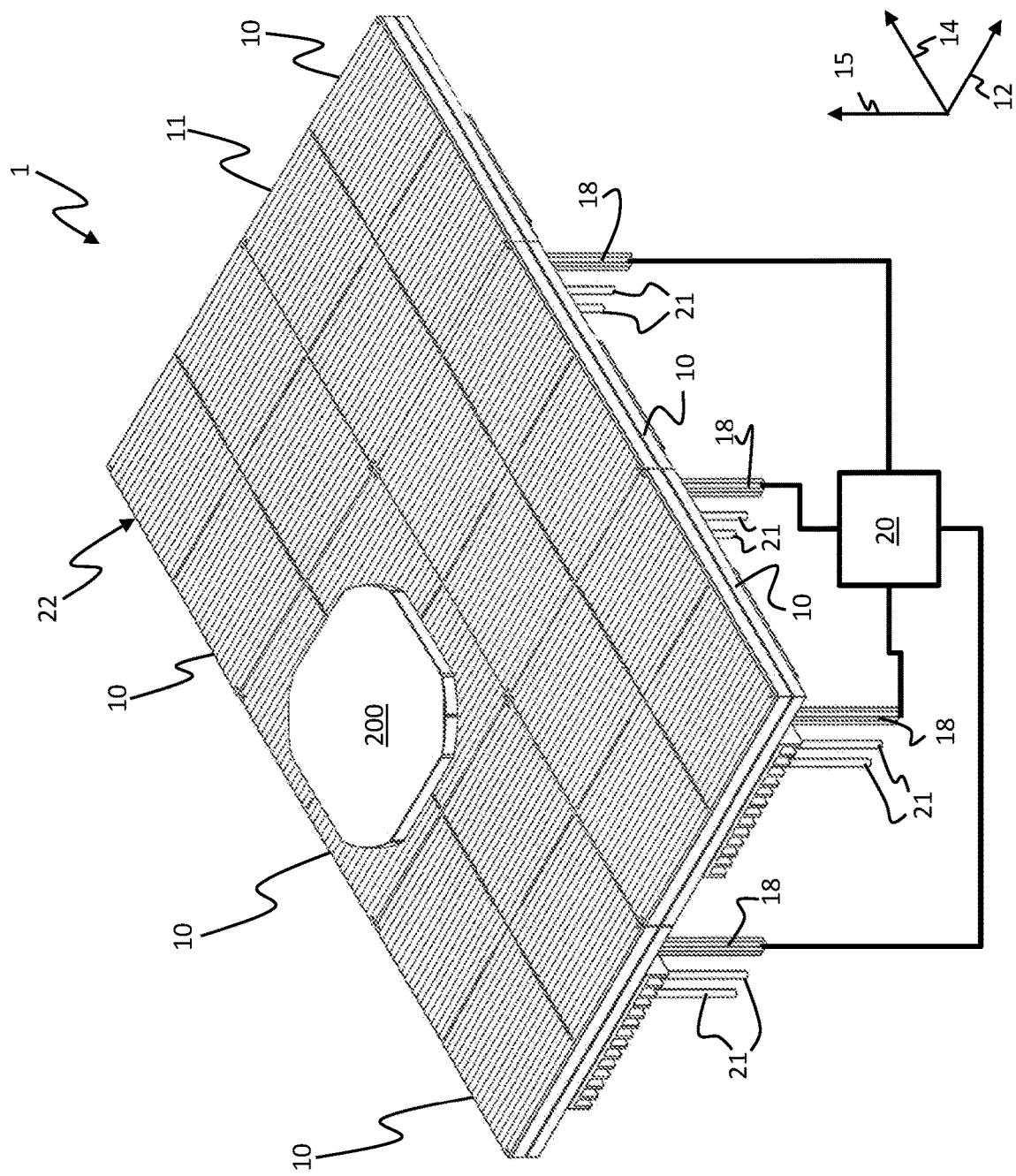
FIG. 2 shows a view of a further planar drive system with six stator modules arranged side by side.

Multiple specimens of the stator module 10 may be arranged adjacent to each other in such a way that the outer edges 30 of adjacent stator modules 10 adjoin on one another and the stator surfaces 11 of the stator modules 10 form a continuous drive surface over which the rotor 200 may be moved without interruption, as shown in FIG. 2. Since the side surfaces of the stator module 10 are flush with the stator surface 11 at the outer edges 30, the stator surfaces 11 of two adjacent stator modules 10 may be arranged almost seamlessly adjoining each other by arranging the stator modules 10 with adjoining side surfaces of the stator assemblies 100 or adjoining outer edges 30 of the stator surfaces 11.

Adjacent stator modules 10 are each arranged adjacent to each other such that the outer edges 30 of the stator surfaces 11 of adjacent stator modules 10 adjoin on one another. As a result, the stator surfaces 11 of the stator modules 10 form a continuous, planar drive surface for the rotor 200. The rotor 200 may be moved seamlessly from the stator surface 11 of one of the stator modules 10 onto or over the stator surface 11 of the adjacent stator module 10. Control signals and/or power may be supplied to each of the stator modules 10 via respective associated connecting lines 18. The data connection lines 18 of all stator modules are connected to a control unit 20. The control unit 20 is thereby configured to control the energizing of the stator modules, as is described in conjunction with FIG. 1.

Alternative embodiments of the stator modules 10 may also include electrical connecting elements by which control signals and/or electrical power may be transmitted from one stator module 10 to the adjacent stator module 10. Such connecting elements may e.g. be arranged on the side surfaces of the stator modules 10. The connecting elements may be embodied as plug connectors or as contact surfaces that may be arranged adjoining one another.

Figure 3:
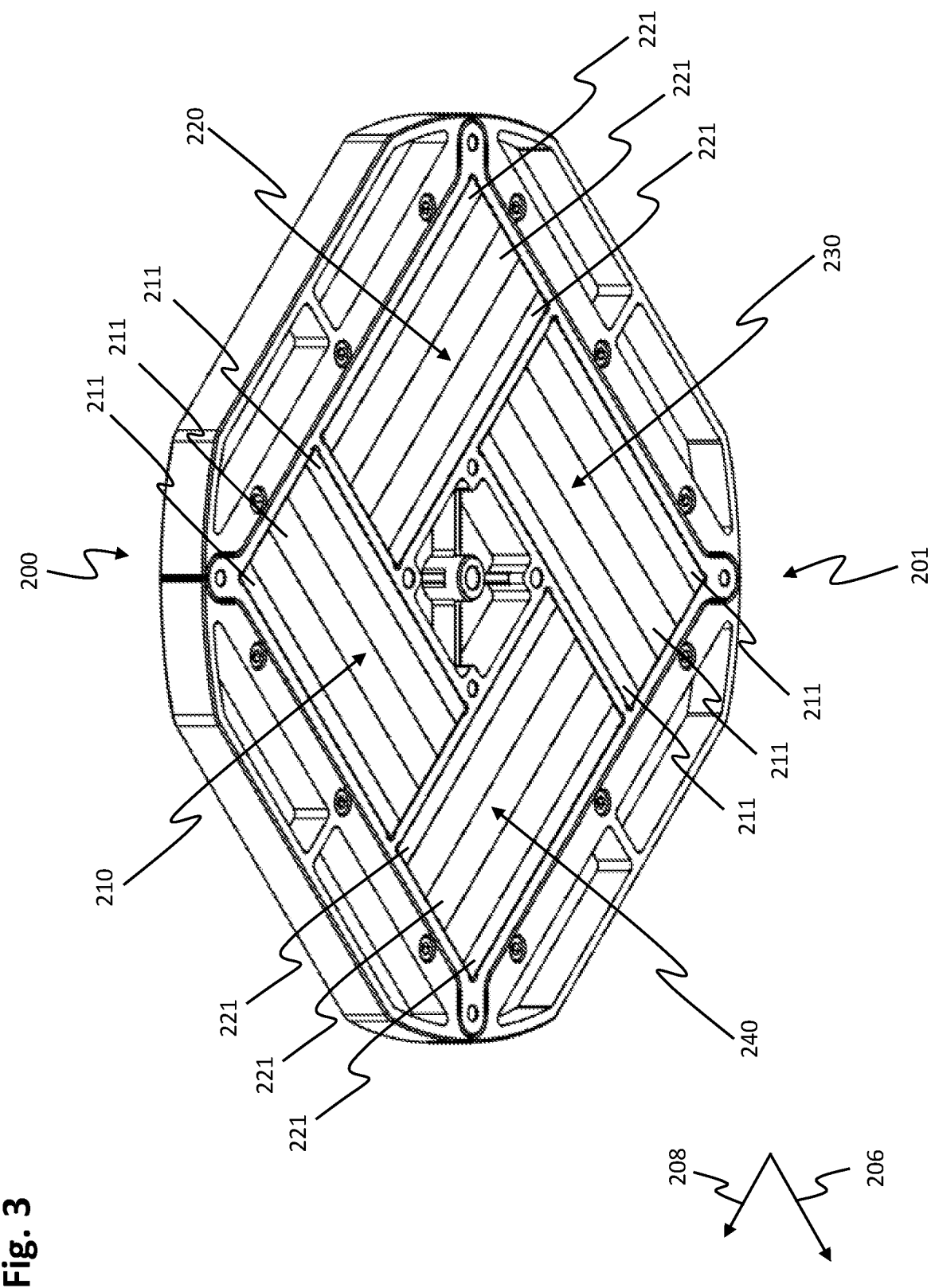
FIG. 3 shows a rotor of the planar drive system shown in FIG. 1 or 2 with a magnet arrangement.

FIG. 3 shows the rotor 200 of the planar drive system of FIGS. 1 and 2 in a view from below onto a bottom side of the rotor 200. The rotor 200 comprises a magnet arrangement 201 on the bottom side. The magnet arrangement 201 is rectangular, in particular square, in shape and comprises a plurality of magnets. The bottom side of the rotor 200 is flat or, respectively, planar, in particular in the area of the magnets of the magnet arrangement 201. In operation, the bottom side of the rotor 200 with the magnet arrangement 201 is oriented substantially parallel to the stator surface 11 and is arranged facing the stator surface 11.

The magnet arrangement 201 includes a first magnet unit 210, a second magnet unit 220, a third magnet unit 230, and a fourth magnet unit 240. The first magnet unit 210 and the third magnet unit 230 each include drive magnets 211 extending in an elongated manner in a first rotor direction 206 and arranged side-by-side along a second rotor direction 208 oriented perpendicular to the first rotor direction 206. In particular, the first and third magnet units 210, 230 may each have three drive magnets 211. The second magnet unit 220 and the fourth magnet unit 240 each comprise further drive magnets 221 arranged side by side in the first rotor direction 206 and extending in an elongated manner along the second rotor direction 208. In operation, the first and third magnet units 210, 230 serve to drive the rotor 200 in the second rotor direction 208, and the second and fourth magnet units 220, 240 serve to drive the rotor 200 in the first rotor direction 206. The drive magnets 211 of the first and third magnet units 210, 230 and the further drive magnets 221 of the second and fourth magnet units 220, 240 are respectively magnetized perpendicularly with regard to the first and second rotor directions 206, 208.

Figure 4:
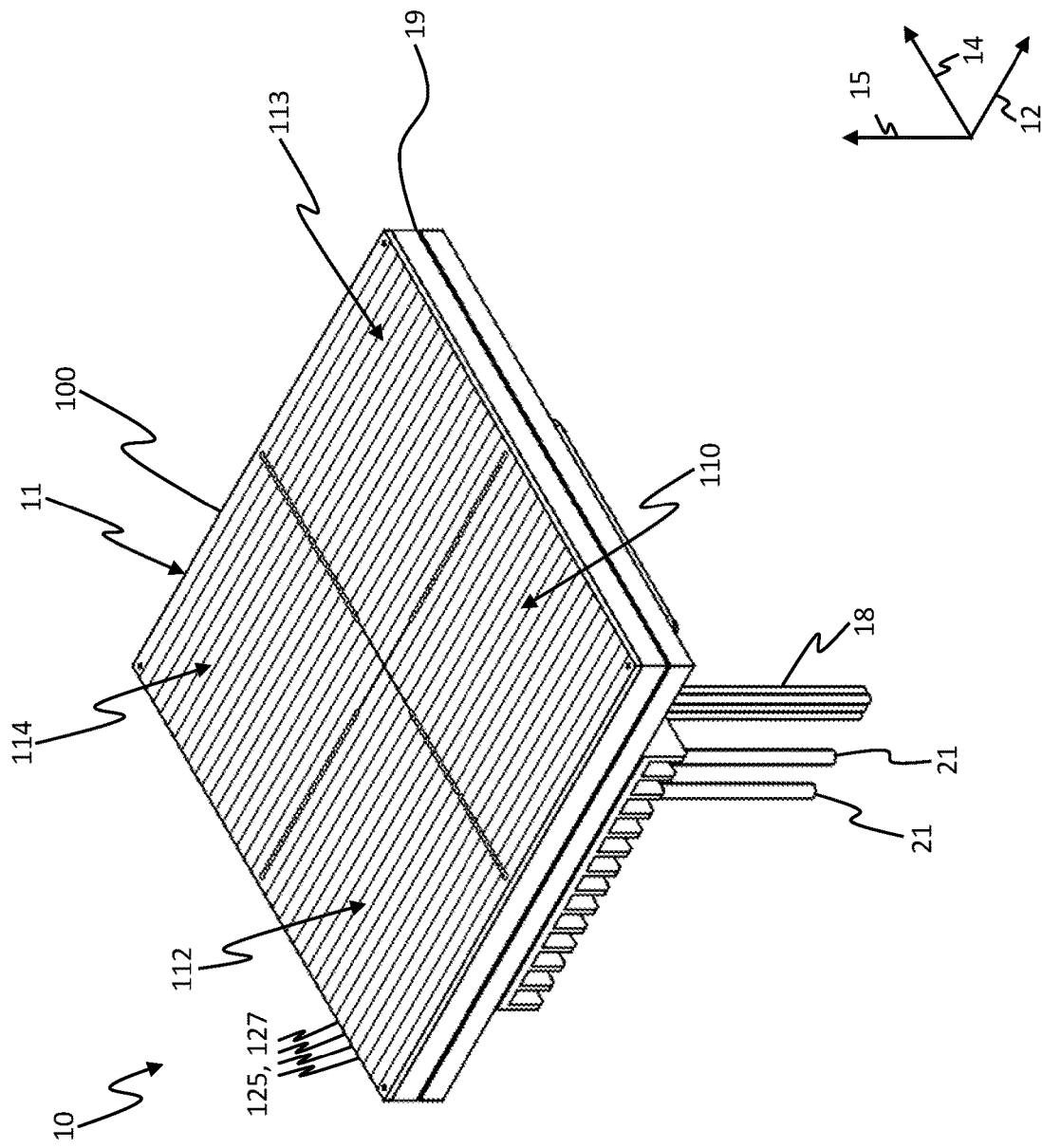
FIG. 4 shows a perspective view of a stator module.

FIG. 4 shows the stator module 10 of the planar drive system 1 in a perspective view without the rotor 200. The stator assembly 100 of the stator module 10 comprises a first stator sector 110, a second stator sector 112, a third stator sector 113 and a fourth stator sector 114. The stator sectors 110, 112, 113, 114 each in turn comprise a portion of conductor strips 125 arranged on the stator surface 11 of the stator assembly 100. Each of the conductor strips 125 at the stator surface 11 is arranged entirely within one of the stator sectors 110, 112, 113, 114. The stator sectors 110, 112, 113, 114 are rectangular in shape. In particular, the stator sectors 110, 112, 113, 114 may be square in shape such that an extension of the stator sectors 110, 112, 113, 114 in the first direction 12 corresponds to an extension of the stator sectors 110, 112, 113, 114 in the second direction 14.

The stator sectors 110, 112, 113, 114 each comprise a quarter of the area, i.e., a quadrant, of the stator assembly 100.

Within the stator sectors 110, 112, 113, 114, the conductor strips 125 are arranged in a plurality of stator layers or stator planes lying on top of one another, each of the stator layers comprising only conductor strips 125 which essentially extend in an elongated manner along either the first direction 12 or essentially along the second direction 14. Apart from the extent of the conductor strips 125, and unless differences are described in the following, the stator sectors 110, 112, 113, 114 are formed identically on the different stator layers. In the stator assembly 100 of the stator module 10 shown in FIG. 4, the stator layer on the stator surface 11 comprises only conductor strips 125, which extend in an elongated manner along the first direction 12 and are arranged side by side and adjoining one another along the second direction 14.

The stator layer visible in FIG. 4 on the stator surface 11 forms a first stator layer of the stator assembly 100. In the vertical direction 15 below the first stator layer, the stator assembly 100 comprises at least one more second stator layer.

Figure 5:
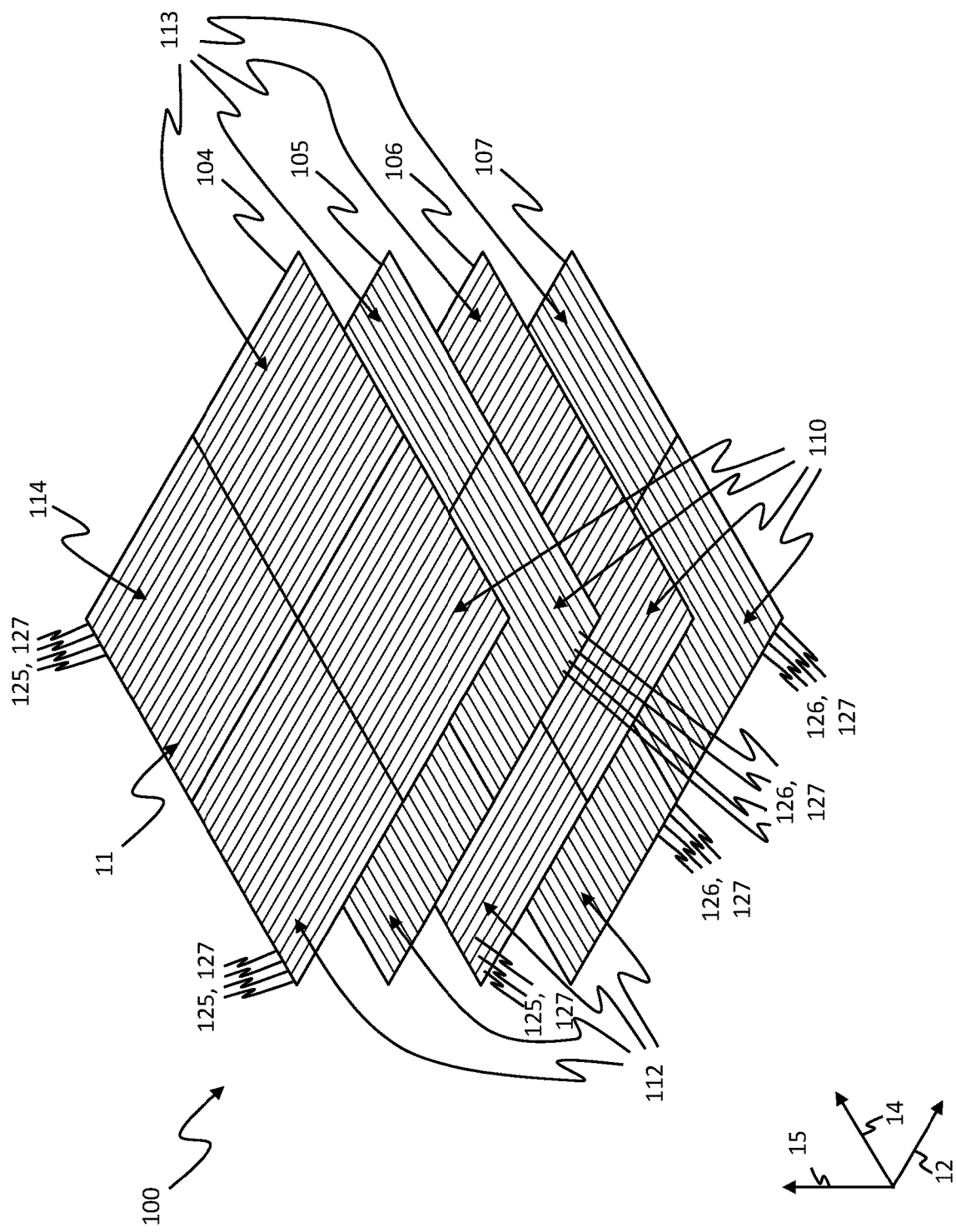
FIG. 5 shows an exploded view of a sector of the planar drive system shown in FIG. 1 or 2 with a first, second, third and fourth stator layer.

FIG. 5 shows a schematic perspective depiction of an exploded view of the stator assembly 100 with the individual stator layers.

In the vertical direction 15, the stator assembly 100 includes a second stator layer 105 under the first stator layer 104 arranged on the stator surface 11, a third stator layer 106 under the second stator layer 105, and a fourth stator layer 107 under the third stator layer 106. Unless differences are described in the following, the second, third, and fourth stator layers 105, 106, 107 are formed like the first stator layer 104 on the stator surface 11 of the stator assembly 100 shown in FIG. 4.

In the third stator layer 106, as in the first stator layer 104, the first to fourth stator sectors 110, 112, 113, 114 comprise conductor strips 125 extending in an elongated manner along the first direction 12 and arranged side by side and adjoining one another in the second direction 14. In the second stator layer 105 and in the fourth stator layer 107, the first to fourth stator sectors 110, 112, 113, 114 comprise further conductor strips 126. Unless differences are described in the following, the further conductor strips 126 are formed like the conductor strips 125 in the first stator layer 104 and in the third stator layer 106. Unlike the conductor strips 125 of the first and third stator layers 104, 106, the further conductor strips 126 of the second and fourth stator layers 105, 107 extend in an elongated manner along the second direction 14 and are arranged side by side and adjoining one another in the first direction 12.

Both the conductor strips 125 and the further conductor strips 126 form a magnetic field generator 127.

In the first and third stator layers 104, 106, the first to fourth stator sectors 110, 112, 113, 114 exclusively comprise the conductor strips 125 extending in an elongated manner along the first direction 12 and not additionally the further conductor strips 126 extending in an elongated manner along the second direction 14. In the second and fourth stator layers 105, 107, the first to fourth stator sectors 110, 112, 113, 114 likewise exclusively comprise the further conductor strips 126 extending in an elongated manner along the second direction 14 and not additionally the conductor strips 125 extending in an elongated manner along the first direction 12.

The first to fourth stator sectors 110, 112, 113, 114 each have the same dimensions in all first to fourth stator layers 104, 105, 106, 107. In particular, the first to fourth stator sectors 110, 112, 113, 114 each have the same dimensions in all first to fourth stator layers 104, 105, 106, 107 in the first direction 12 and in the second direction 14.

The conductor strips 125 and the further conductor strips 126 of first to fourth stator layers 104, 105, 106, 107 arranged on top of one another are each embodied to be electrically insulated from one another. For example, the first to fourth stator layers 104, 105, 106, 107 may each be formed as mutually insulated conductor path layers of a multi-layer printed circuit board.

The first to fourth stator sectors 110, 112, 113, 114 are embodied to be energizable independently from one another. In particular, the conductor strips 125 and the further conductor strips 126 of the first to fourth stator sectors 110, 112, 113, 114 are embodied on the stator assembly 100 to be electrically insulated from one another.

While the conductor strips 125 and the further conductor strips 126 of the individual first to fourth stator sectors 110, 112, 113, 114 on the stator assembly 100 are each embodied to be electrically isolated from the conductor strips 125 and the further conductor strips 126 of the remaining first to fourth stator sectors 110, 112, 113, 114, the conductor strips 125 and further conductor strips 126 within the individual first to fourth stator sectors 110, 112, 113, 114 may each be electrically conductively connected to one another. In particular, within each of the first to fourth stator sectors 110, 112, 113, 114, stacked conductor strips 125 of the first stator layer 104 and the third stator layer 106 may be electroconductively connected to one another. For example, respective conductor strips 125 of the first to fourth stator sectors 110, 112, 113, 114 arranged on top of one another may be connected in series. Similarly, within each of the first to fourth stator sectors 110, 112, 113, 114, further conductor strips 126 of the second stator layer 105 and the fourth stator layer 107 may be electrically conductively interconnected. For example, further conductor strips 126 of the first to fourth stator sectors 110, 112, 113, 114 arranged on top of one another may be connected in series.

Alternative embodiments of the stator assembly 100 may comprise further stator layers arranged one below the other between the second and third stator layers 105, 106 in the vertical direction 15. In this context, the stator assembly 100 may in the vertical direction 15 in each case comprise alternating stator layers having conductor strips 125 essentially extending in an elongated manner along the first direction 12 and stator layers with further conductor strips 126 essentially extending in an elongated manner along the second direction 14. In an alternative embodiment, the stator assembly 100 may in the vertical direction 15 comprise respective stator layers having conductor strips 125 essentially extending in an elongated manner along the first direction 12 and stator layers having further conductor strips 126 essentially extending in an elongated manner along the second direction 14, wherein the sum of the stator layers having conductor strips 125 essentially extending in an elongated manner along the first direction 12 and the sum of the stator layers having further conductor strips 126 essentially extending in an elongated manner along the second direction 14 have an equal mean distance from the stator surface 11. Furthermore, in alternative embodiments of the stator assembly 100, further stator layers with conductor strips 125 extending in an elongated manner along the first direction 12 or with further conductor strips 126 extending in an elongated manner along the second direction 14 may be arranged between the first and the second stator layers 104, 105 and/or between the third and the fourth stator layers 106, 107.

The conductor strips 125, 126 of the first through fourth stator sectors 110, 112, 113, 114 are respectively combined into stator segments within the first through fourth stator layers 104, 105, 106, 107.

Figure 6:
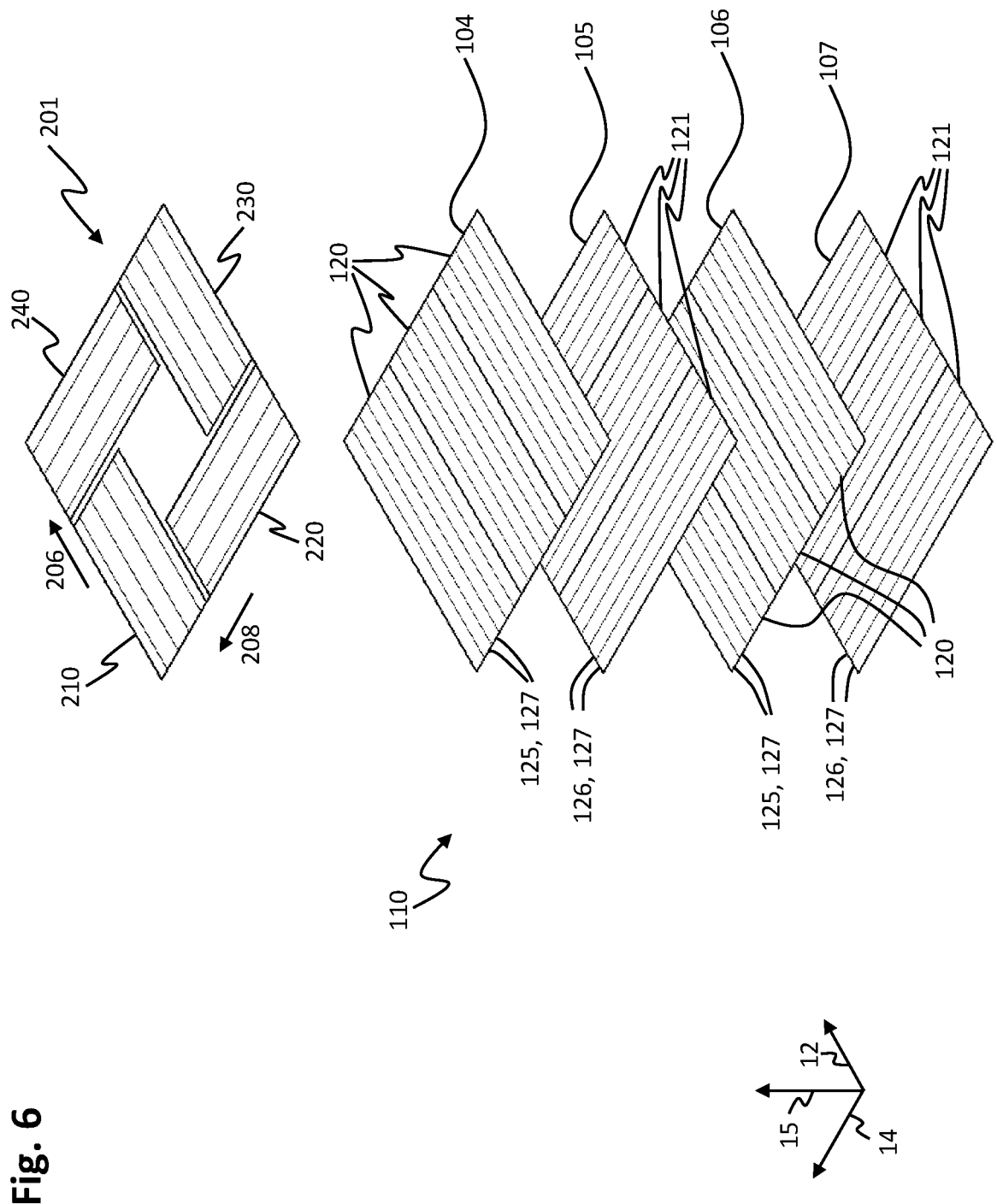
FIG. 6 shows the stator layers of the first sector of the device shown in FIG. 5 with individual stator segments and a magnet arrangement of a rotor.

FIG. 6 shows a schematic depiction of the first to fourth stator layers 104, 105, 106, 107 of the first stator sector 110 with the individual stator segments.

The conductor strips 125 and further conductor strips 126 of the first stator sector 110 are combined into stator segments 120, 121 within each of the first to fourth stator layers 104, 105, 106, 107. In each of the first to fourth stator layers 104, 105, 106, 107, the first stator sector 110 comprises three stator segments 120, 121 arranged side by side and adjoining one another. Each of the stator segments 120, 121 comprises six conductor strips 125 or further conductor strips 126 arranged side by side. The first stator sector 110 comprises three first stator segments 120 in each of the first and third stator layers 104, 106 and three second stator segments 121 in each of the second and fourth stator layers 105, 107. The first stator segments 120 each comprise six adjacent ones of the conductor strips 125 arranged side by side along the second direction 14 and extending in an elongated manner along the first direction 12, and the second stator segments 121 each comprise six adjacent ones of the further conductor strips 126 arranged side-by-side along the first direction 12 and extending in an elongated manner along the second direction 14.

Thus, in the first stator layer 104 and in the third stator layer 106, the first stator sector 110 of the stator assembly 100 exclusively comprises conductor strips 125 in an elongated manner along the first direction 12, and, in the second stator layer 105 and in the fourth stator layer 107, exclusively further conductor strips 126 in an elongated manner along the second direction 14.

The first and second stator segments 120, 121 have identical dimensions except for their orientation. In particular, the dimensions of the first stator segments 120 in the first direction 12 correspond to the dimensions of the second stator segments 121 in the second direction 14, and the dimensions of the first stator segments 120 in the second direction 14 correspond to the dimensions of the second stator segments 121 in the first direction 12.

The stator segments 120, 121 are arranged on top of one another in such a way that each of the first stator segments 120 of the first and third stator layers 104, 106 of the first stator sector 110 extends in the first direction 12 over the three second stator segments 121 of the second and fourth stator layers 105, 107 of the first stator sector 110 that are arranged side by side to one another in the first direction 12. Further, the second stator segments 121 of the second and fourth stator layers 105, 107 of the first stator sector 110 extend in the second direction 14 over all of the first stator segments 120 of the first and third stator layers 104, 106 of the first stator sector 110 that are arranged side by side to one another in the second direction 14.

The arrangement of the conductor strips 125 and further conductor strips 126 in the first to fourth stator layers 104, 105, 106, 107 of the second stator sector 112, the third stator sector 113 and the fourth stator sector 114 corresponds to the arrangement of the conductor strips 125 and further conductor strips 126 in the first to fourth stator layers 104, 105, 106, 107 of the first stator sector 110 shown in FIG. 6.

When operating the planar drive system 1, the rotor 200 may be aligned over the stator assembly 100 such that the first rotor direction 206 is oriented along the first direction 12 and the second rotor direction 208 is oriented along the second direction 14. In operation, the first magnet unit 210 and the third magnet unit 230 may interact with the magnetic field generated by the conductor strips 125 of the first stator segments 120 to drive the rotor 200 along the second direction 14. The second magnet unit 220 and the fourth magnet unit 240 may in operation interact with the magnetic field generated by the further conductor strips 126 of the second stator segments 121 to drive the rotor 200 along the first direction 12.

Alternatively, other than shown in FIG. 6, the rotor 200 may be oriented such that the first rotor direction 206 is oriented along the second direction 14 and the second rotor direction 208 is oriented along the first direction 12. In this case, the first and third magnetic units 210, 230 interact with the magnetic field of the second stator segments 121 to drive the rotor 200 in the first direction 12 and the second and fourth magnetic units 220, 240 interact with the magnetic field of the first stator segments 120 to drive the rotor 200 in the second direction 14.

The conductor strips 125 or further conductor strips 126 of the individual first or second stator segments 120, 121 may each be supplied with the drive currents independently of the conductor strips 125 or further conductor strips 126 of the remaining first or second stator segments 120, 121. In particular, the drive currents in one of the first or second stator segments 120, 121 do not necessarily depend on drive currents in one of the other first or second stator segments 120, 121. Furthermore, the conductor strips 125 or further conductor strips 126 of one of the first or second stator segments 120, 121 may be energized with drive currents while the conductor strips 125 or further conductor strips 126 of another, for example an adjacent, first or second stator segment 120, 121 are without current. The conductor strips 125 or further conductor strips 126 of the individual first or second stator segments 120, 121 are electrically isolated from the conductor strips 125 or further conductor strips 126 of the remaining first or second stator segments 120, 121 on the stator assembly 100. The conductor strips 125 or further conductor strips 126 of different first or second stator segments 120, 121 may e.g. be supplied with the drive currents from respective separate power modules or from separate power generation units or output stages of a power module of the stator module 10.

The conductor strips 125 or further conductor strips 126 in the individual first to fourth stator sectors 110, 112, 113, 114 may each be interconnected to form multi-phase systems with a shared neutral point. The neutral point may be formed on the stator assembly 100. In particular, the conductor strips 125 or further conductor strips 126 may be interconnected to form three-phase systems with a shared neutral point. The three-phase systems may each comprise six adjacent conductor strips 125 or six adjacent further conductor strips 126. The number of adjacent conductor strips 125 or further conductor strips 126 in one of the three-phase systems may also be three, twelve or another multiple of three in each case.

The multi-phase systems may be contactable on the stator assembly 100 in such a way that each of the multi-phase systems may be supplied with a drive current independently of the other multi-phase systems. Alternatively, two or more of the multi-phase systems may each be connected to one another on the stator assembly 100 such that a common drive current is jointly applied to each of the connected multi-phase systems. For example, the connected multi-phase systems on the stator assembly 100 may be connected in series or in parallel.

If the conductor strips 125 or further conductor strips 126 are interconnected to form multi-phase systems, fewer contacts are required for energizing the conductor strips 125 or further conductor strips 126 than when separately energizing the individual conductor strips 125 or further conductor strips 126. This reduces the amount of hardware required for energizing the conductor strips 125 or further conductor strips 126, in particular the number of power-generating units required for energization.

The first to fourth stator sectors 110, 112, 113, 114 may each include eighteen conductor strips 125 or further conductor strips 126 in each of the first through fourth stator layers 104, 105, 106, 107, as shown in FIGS. 4 and 5. Six adjacent conductor strips 125 or further conductor strips 126 may each be interconnected to form a three-phase system, and the first to fourth stator sectors 110, 112, 113, 114 may each comprise three three-phase systems side by side in the first direction 12 and three three-phase systems arranged side by side in the second direction 14. In this regard, conductor strips 125 or further conductor strips 126, which are essentially extended in the same direction 12, 14 and are positioned on top of one another in the first to fourth stator layers 104, 105, 106, 107, may be connected in series to form a common three-phase system. The conductor strips 125 or further conductor strips 126 may thereby be connected in such a way that conductor strips 125 or further conductor strips 126 positioned on top of one another in the vertical direction 15 are each supplied with the same drive current. The three-phase systems thus have three phases which are interconnected through conductor strips 125 or further conductor strips 126 positioned on top of one another in the first to fourth stator layers 104, 105, 106, 107.

For example, in each of the individual first to fourth stator layers 104, 105, 106, 107, all conductor strips 125 or further conductor strips 126 positioned on top of one another and aligned in parallel may be connected in series. In particular, the conductor strips 125 of three-phase systems positioned on top of one another in the first stator layer 104 and in the third stator layer 106, and the further conductor strips 126 of three-phase systems positioned on top of one another in the second stator layer 105 and in the fourth stator layer 107 may each be connected in series to form a shared three-phase system. Thereby, all conductor strips 125 or further conductor strips 126 of the first and third stator layers 104, 106 and of the second and fourth stator layers 105, 107 which are positioned on top of one another in the vertical direction 15 and oriented in parallel may be connected in series.

In particular, in the stator assembly 100 within the individual stator segments 120, the conductor strips 125 extending in an elongated manner along the first direction 12 are each connected to form multi-phase systems with a shared neutral point. In this case, the individual multi-phase systems of different stator segments 120 may each be energized independently of one another. Similarly, all further conductor strips 126 of the individual further stator segments 121 are each connected to form further multi-phase systems. The individual further multi-phase systems of the further stator segments 121 may each be supplied with current independently of one another and independently of the multi-phase systems of the stator segments 120. In particular, the conductor strips 125 of the stator segments 120 and the further conductor strips 126 of the further stator segments 121 are each connected to form three-phase systems. A three-phase drive current may be applied to each of the conductor strips 125 and the further conductor strips 126. The drive currents comprise a first phase U, a second phase V and a third phase W, each having a phase offset of 120° with regard to one another.

The conductor strips 125 are spatially offset in the second direction 14 by in each case one third of the effective wavelength of the drive magnets 211 of the first and third magnet units 210, 230 interacting with the conductor strips 125. The further conductor strips 126 are arranged spatially offset in the first direction 12 by in each case one third of the effective further wavelength of the further drive magnets 221 of the second and fourth magnet units 220, 240 interacting with the further conductor strips 126.

The rotor represents the movable element of the device and comprises means for generating a magnetic field, in particular magnets or permanent magnets. The magnetic field of the rotor, together with the variable magnetic field of the stator assembly, ensures that the rotor is moved over the stator assembly so that, in particular, an air gap is formed between the stator assembly and the rotor.

Thus, as described in conjunction with FIGS. 1 to 6, the rotor 200 may be moved over a drive surface formed of stator modules 10. This is done by generating a magnetic drive field with the magnetic field generators 127 which are embodied as conductor strips 125 and further conductor strips 126. The following description explains by which criteria the conductor strips 125 and further conductor strips are supplied with currents and on the basis of which criteria this energizing is carried out. In this context, virtual two-dimensional potential curves are used for the rotor 200.

Figure 7:
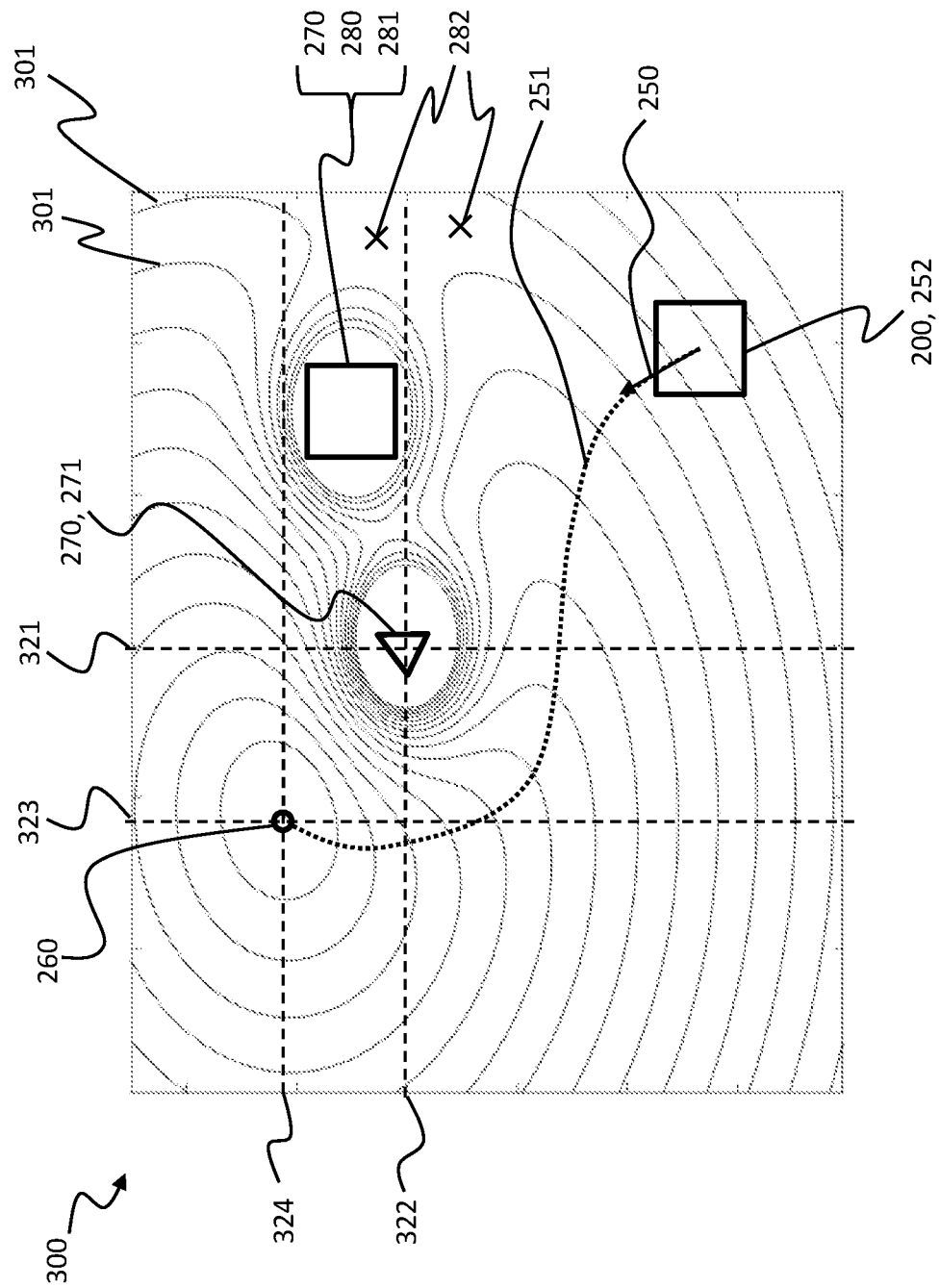
FIG. 7 shows a virtual potential curve with a rotor, a target point and obstacles.

FIG. 7 shows a virtual two-dimensional potential curve 300 that may be used in a drive process of a planar drive system. A rotor 200 which may correspond to the rotors 200 shown in FIGS. 1 to 3 is moved on a drive surface 22. The drive surface 22 may include the stator surfaces 11 of FIGS. 1 and 2. A progression of equipotential lines 301 is shown in FIG. 7. With the virtual two-dimensional potential curve 300, a movement of the rotor 200 to a target point 260 is to be enabled by correspondingly energizing the stator assemblies 100 or conductor strips 125 or further conductor strips 126, respectively, of the stator modules 10 shown in FIGS. 1 to 6, resulting in a driving force due to the magnetic drive fields generated by energizing in conjunction with the permanent magnet of the rotor 200. Alternatively, magnetic field generators may be controlled such that such a magnetic drive field results. Also shown in FIG. 7 are two obstacles 270, one of the obstacles 270 being another rotor 280. The rotor 200 is arranged at a first position 252. In this case, the equipotential lines 301 result from an attractive potential of the target point 260 and repulsive potentials of the obstacles 270. Based on the obstacles 270 and the target point 260, the virtual two-dimensional potential curve 300 is thus determined. In a subsequent step, a virtual force vector 250 is determined at the first position 252 of the rotor. The virtual force vector 250 has a vector direction and a vector length, which are illustrated in FIG. 7 by arrows habitually used for vectors. Subsequently, the conductor strips of the sectors of the stator modules are energized in such a way that energizing of the conductor strips generates a magnetic drive field which interacts with the magnetic field of the rotor 200 in such a way that a resulting force acts on the rotor 200 due to the interaction of the magnetic drive field with the magnetic field, wherein a direction of the resulting force may be set on the basis of the vector direction of the virtual force vector 250. A current strength of the energization may be set based on the vector length of the virtual force vector 250. As a result, the rotor 200 moves a little towards the target point 260 along a path of movement 251. Alternatively, a control of the generation of the magnetic drive field may be accomplished by controlling a magnetic field generator accordingly.

It may be provided to generate the resulting force based on the magnetic drive field and the magnetic field in such a way that the rotor 200 moves in the direction of the virtual force. In this way, in particular, an already occurring movement of the rotor 200 may be taken into account.

In addition to the vector length, other parameters may also be taken into account when controlling the current flow to the conductor strips. For example, the current supply may be controlled in such a way that a maximum current specified on the basis of the conductor strips and/or the temperature of the stator modules is not exceeded.

The temperature at each point on the drive surface 22 could also be represented and accounted for by its own potential. This would allow locations on the drive surface 22 that have become hot due to a high current in the past to be bypassed by the rotor 200. The temperature of the drive surface 22 could be detected by temperature sensors. Furthermore, the current applied to the conductor strips may be reduced if a load on a rotor 200 is only allowed to reach a maximum acceleration, e.g. if a liquid is transported on the rotor 200 in an open vessel. Thus, operating parameters of the stator modules and movement parameters of the rotor 200 may also be taken into account. These two different parameters may also be taken into account in the direction of the resulting force.

In order to control the magnetic field generator 127, which may e.g. be embodied in the form of conductor strips 125 and further conductor strips 126, it may be provided that the direction of the resulting force acting due to the interaction of the magnetic drive field generated by the magnetic field generator 127 and the magnetic field of the rotor 200 is set in parallel to the vector direction. In this regard, dynamic limits and dynamic planning in general may additionally be taken into account.

Alternatively, it may be provided to set the direction and strength of the resulting force in such a way that the rotor 200 is moved as soon as possible in the direction of the virtual force, i.e. in the vector direction, wherein it may be provided to take into account permitted dynamic limits. If the rotor 200 is already moving, the direction of the resulting force required for this may differ from the direction of the virtual force.

Further criteria for setting the direction and the strength of the resulting force based on the vector direction and the vector length are conceivable, as well, for example by using a combination of the two aforementioned methods.

In an embodiment of the method, it is provided that the first position 252 of the rotor 200 is determined by sensors within the stator modules. Additionally or alternatively, it may further be provided that a second position of the obstacles 270, in particular a second position 271 of the obstacle 270 as well as a further second position 281 of the further rotor 280 are determined by these sensors.

In another embodiment, the virtual force vector 250 is determined using a two-dimensional derivative of the virtual two-dimensional potential curve 300. In particular, the calculation may be performed by calculating a gradient of the virtual two-dimensional potential curve 300.

If the calculation of the virtual force vector 250 is performed by the gradient of the virtual two-dimensional potential curve 300 and the rotor 200 is subsequently in each case driven in such a way that the virtual force vector 250 is parallel to the path of movement at all points on the path of movement 251, the rotor moves along the path of movement 251 in such a way that the path of movement 251 intersects the equipotential lines 301 perpendicularly.

Figure 8:
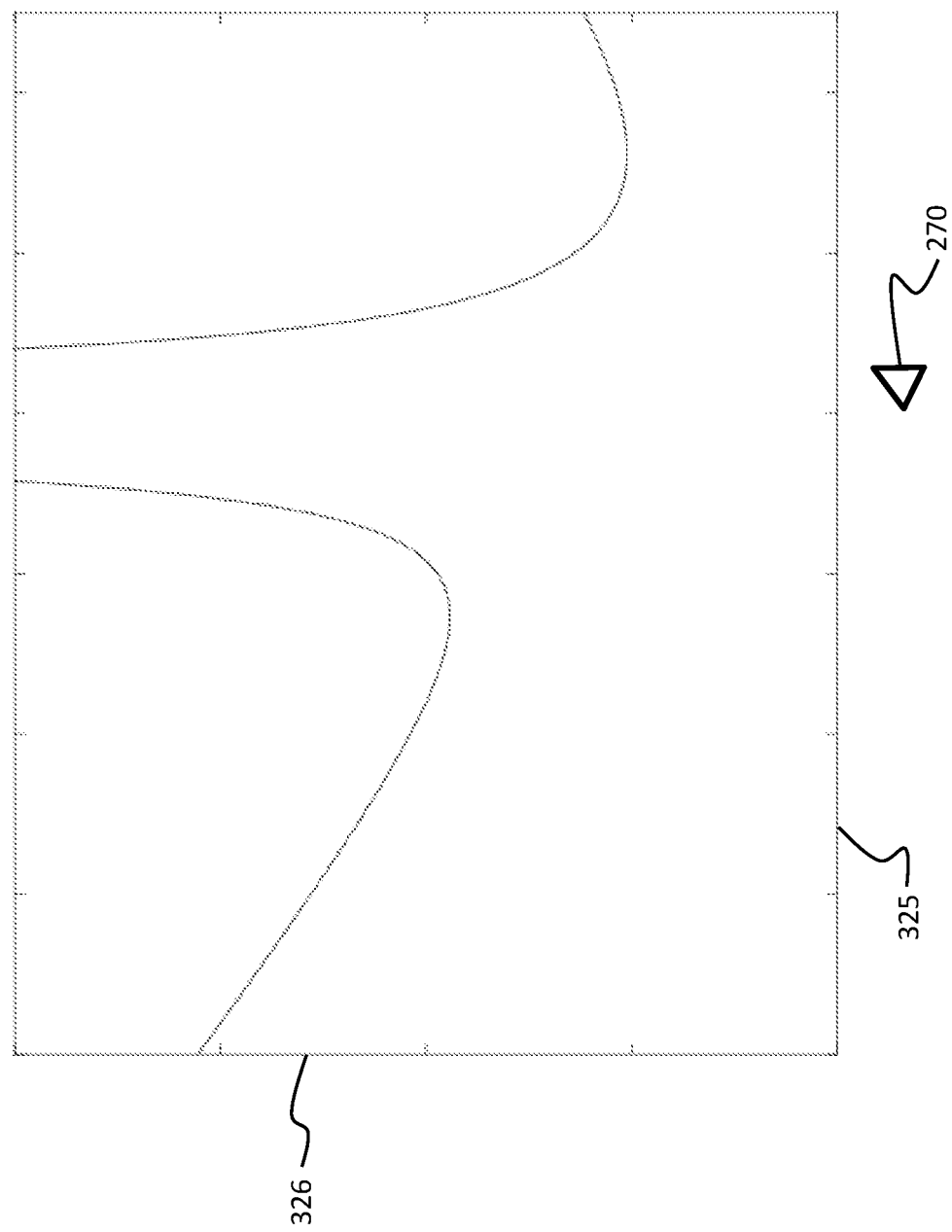
FIGS. 8 to 11 shows virtual potential curves at different intersection lines of the virtual potential curve of FIG. 7.

FIG. 8 shows a virtual potential curve 326 at a first intersection line 321 shown in FIG. 7, wherein the first intersection line 321 passes through the obstacle 270. The virtual potential curve 326 illustrates that the virtual potential of the obstacle 270 becomes infinitely large. In FIG. 8, the virtual potential curve 326 is plotted over the location 325, wherein the location 325 corresponds to a position along the first intersection line 321 of FIG. 7.

Figure 9:
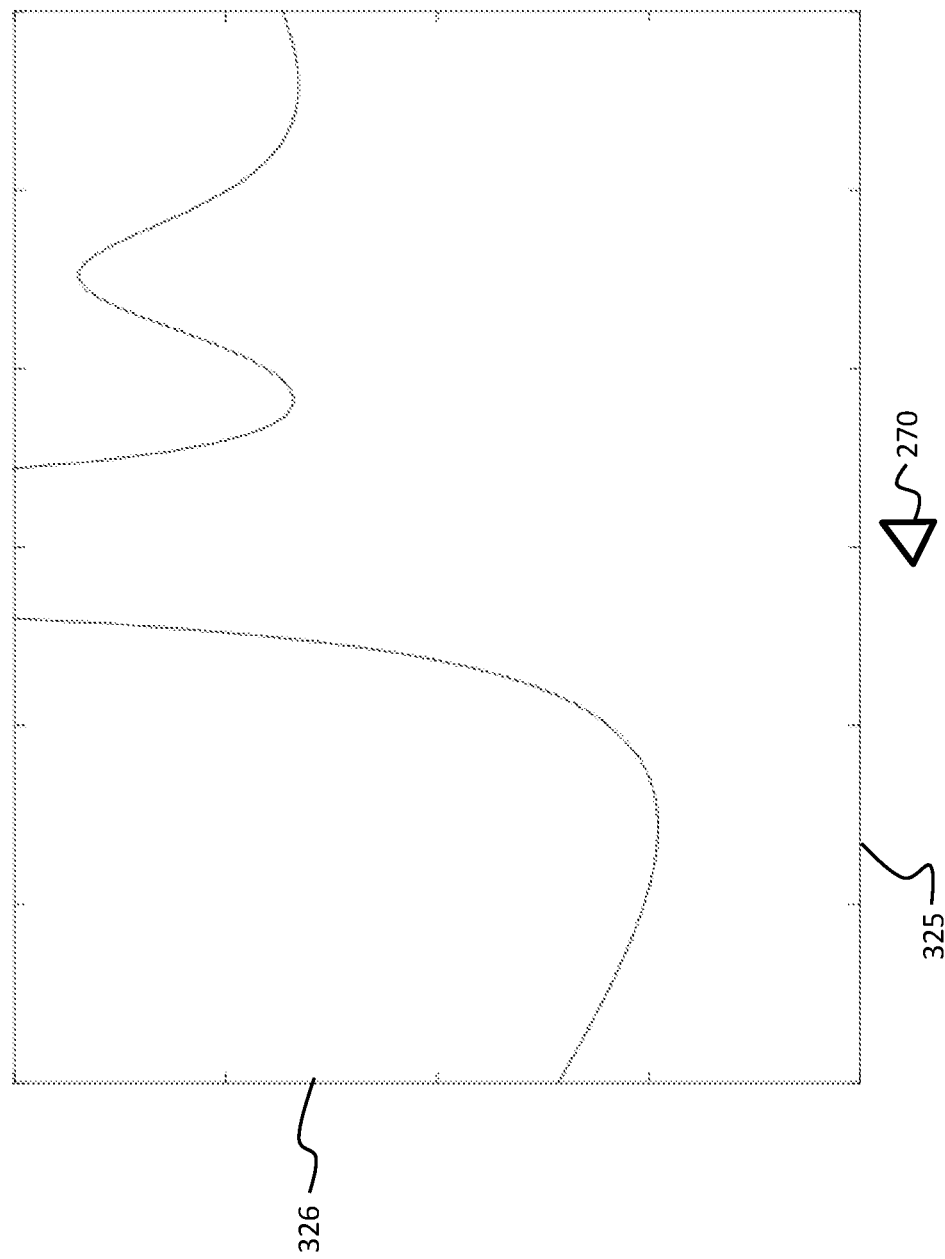

FIG. 9 shows an illustration identical to FIG. 8 of a virtual potential profile 326 along a second intersection line 322 of FIG. 7, which also runs through the obstacle 270.

Figure 10:
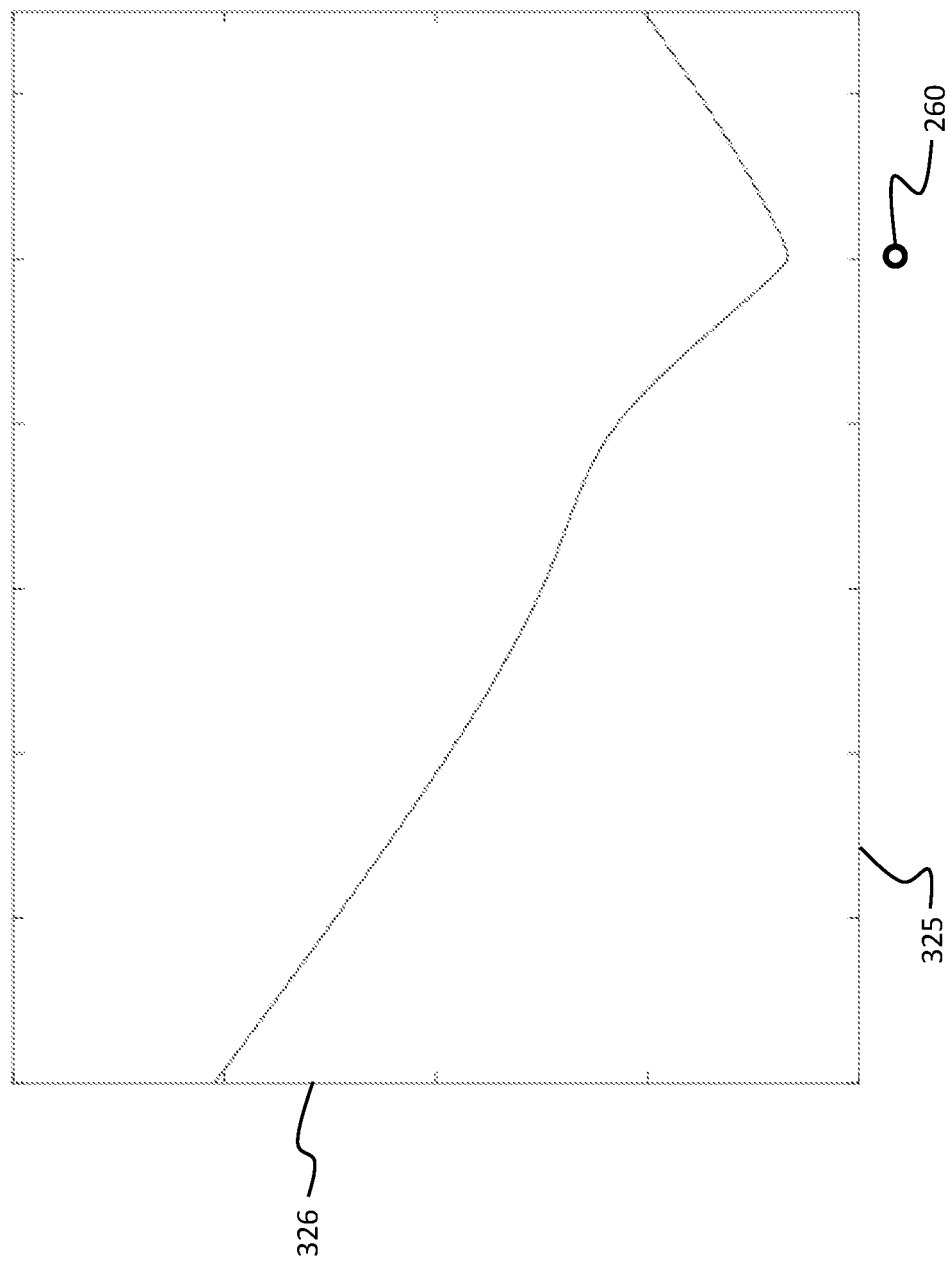

FIG. 10 shows a virtual potential curve 326 analogous to FIGS. 8 and 9 along a third intersection line 323 of FIG. 7, wherein the third intersection line 323 is parallel to the first intersection line 321 through the target point 260. This makes it clear that an attractive potential is associated with the target point 260.

Figure 11:
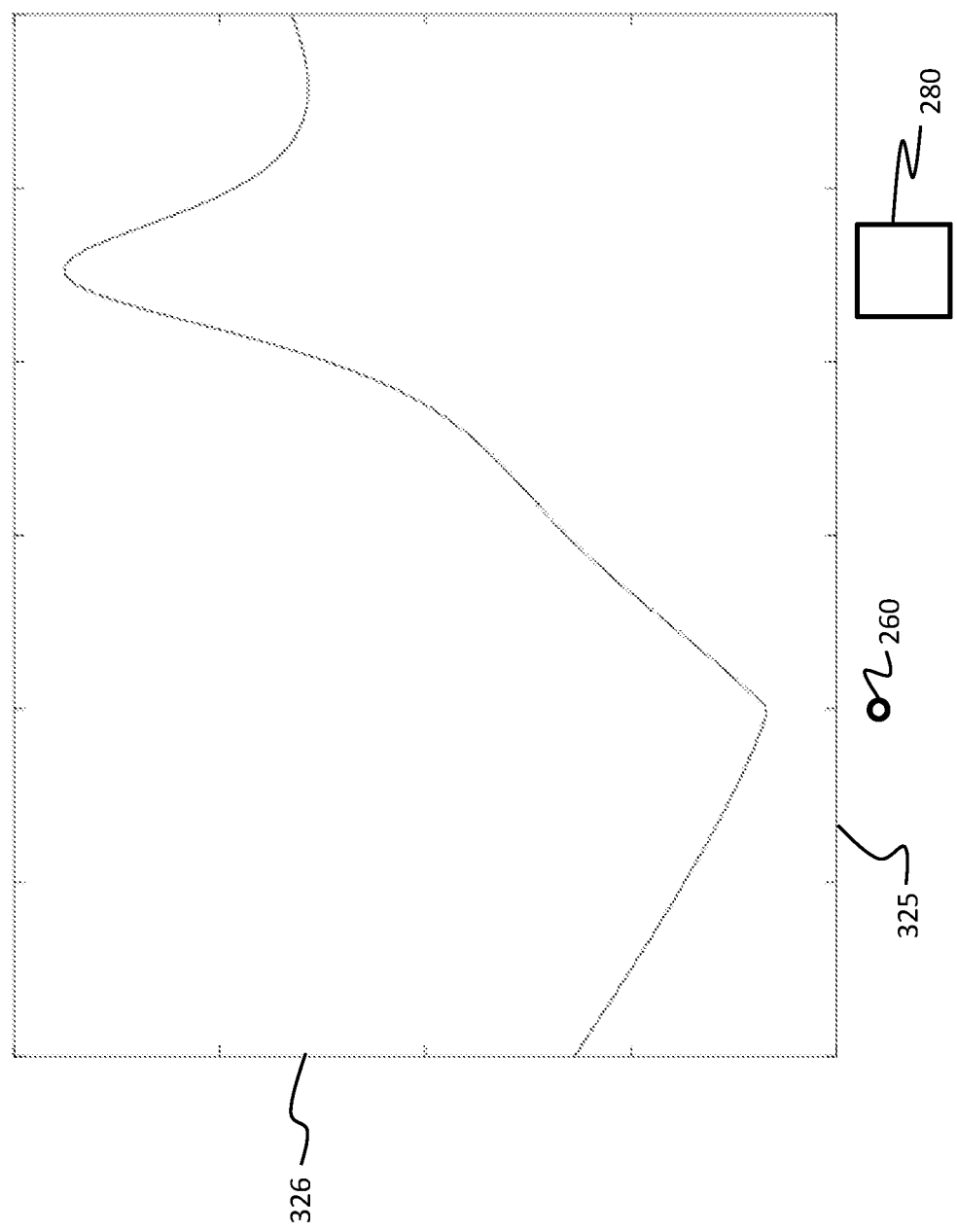

FIG. 11 shows a virtual potential curve 326 along a fourth intersection line 324 of FIG. 7, which also passes through the target point 260 and is guided in parallel to the second intersection line 322. In this virtual potential curve 326, a higher potential is visible to the right of the area of the target point 260 in the area of the further rotor 280.

The virtual two-dimensional potential curve 300 shown in FIGS. 7 to 11 may be determined using the following calculations as an example. Coordinates x and y in the range between 0 and 1 are assigned to the drive surface 22 shown in FIG. 7. For the target point 260, a quadratic partial potential is calculated using the equation $$V\_z = 15 * \mathrm{sqrt}((x-0.2)^2 + (y-0.8)^2).$$

A partial potential is assigned to obstacle 270 using the equation $$V\_h = 0.1/((x-0.4)^2 + (y-0.6)^2).$$

The further rotor 280 is assigned a partial potential using the equation $$V\_m = 0.1/((x-0.7)^2 + (y-0.7)^2).$$

The virtual two-dimensional potential curve 300 accordingly results from the superposition of the individual potentials:

$$V = V\_z + V\_h + V\_m.$$

Alternatively, other partial potentials may be included in the calculation using different equations.

In an embodiment, a temperature of an area of a stator module 10, in particular a temperature of a stator module 10 or a plurality of stator modules 10, is taken into account when determining the virtual two-dimensional potential curve 300. In this context, a repulsive potential may be assigned to areas of the drive surface 22, the higher the temperature in the corresponding area, the greater the repulsive potential. In addition, temperature sensors may be provided by which the temperature of the areas is detected. As a result, areas of the drive surface 22 that are heated due to a previous generation of a drive force may be less frequented and thus cool down again.

In another embodiment, the procedure described in FIG. 7 with the virtual two-dimensional potential curve 300 and the virtual potential curve 326 shown in FIGS. 8 to 11 is also carried out for the further rotor 280. It may be provided to assign different priorities to the rotor 200 and the further rotor 280. The priority of the rotors 200 may thereby be a measure of which rotor 200, 280 should preferably be moved towards its target point 260 when the rotors 200, 280 are moved over the drive surface 22 and/or which rotor 200, 280 should rather avoid the other rotor 200, 280. Determining the virtual two-dimensional potential curve 300 may be performed such that the rotor 200 or the further rotor 280 to which the higher priority is assigned has a higher potential. For example, the rotor 200 may be assigned a higher priority than the further rotor 280. The further rotor 280 is considered to have a lower potential when determining the virtual two-dimensional potential curve for the rotor 200 than is the case for the rotor 200 when determining the virtual two-dimensional potential curve for the further rotor 280.

In an embodiment, the process is carried out again after of a predefined period of time has expired. In particular, this may mean repeatedly executing the procedure in predefinable time cycles. In FIG. 7, for example, the rotor 200 may be moved along the movement path 251 in the direction of the virtual force vector 250. After a predetermined or predeterminable period of time, either the virtual force vector 250 may now be determined again on the basis of the virtual two-dimensional potential curve 300 already determined and thereby e.g. be adjusted in direction, since the movement path 251 is not linear but curved. After passing through a part of the curved path of movement 251, the direction of the virtual force vector 250 is thus changed by running through the process steps again.

In another embodiment, a movement of the further rotor 280 is taken into account when determining the virtual two-dimensional potential curve 300. On the one hand, this may be done during a repeated run of the method on the basis of the respective current further second position 281 of the further rotor 280. On the other hand, a predicted further second position 281 may already be included in the determination of the virtual two-dimensional potential curve shown in FIG. 7, e.g. by taking into account future further second positions 282, as well, when determining the virtual two-dimensional potential curve 251. The movement of the further rotor 280 may thereby either be detected by sensors of the stator assembly or, if the method is also applied to the further rotor 280, be taken into account on the basis of a movement of the further rotor 280 triggered by the method.

In an embodiment, the target point 260 is changed when the method steps are repeated. In this case, in addition to determining a new virtual force vector 250, the entire virtual two-dimensional potential curve 300 is also redetermined based on the changed target point. Likewise, it may be provided to carry out a redetermination of the virtual two-dimensional potential curve 300 based on a movement of the further rotor 280. The movement of the further rotor 280 may thereby either be detected by sensors of the stator assembly or, if the method is also applied to the further rotor 280, be taken into account on the basis of a movement of the further rotor 280 triggered by the method.

In another embodiment, virtual compensation potentials are considered in determining the virtual two-dimensional potential trajectory 300 such that there are no local potential minima on the trajectory 251 between the rotor 200 and the target point 260.

Figure 12:
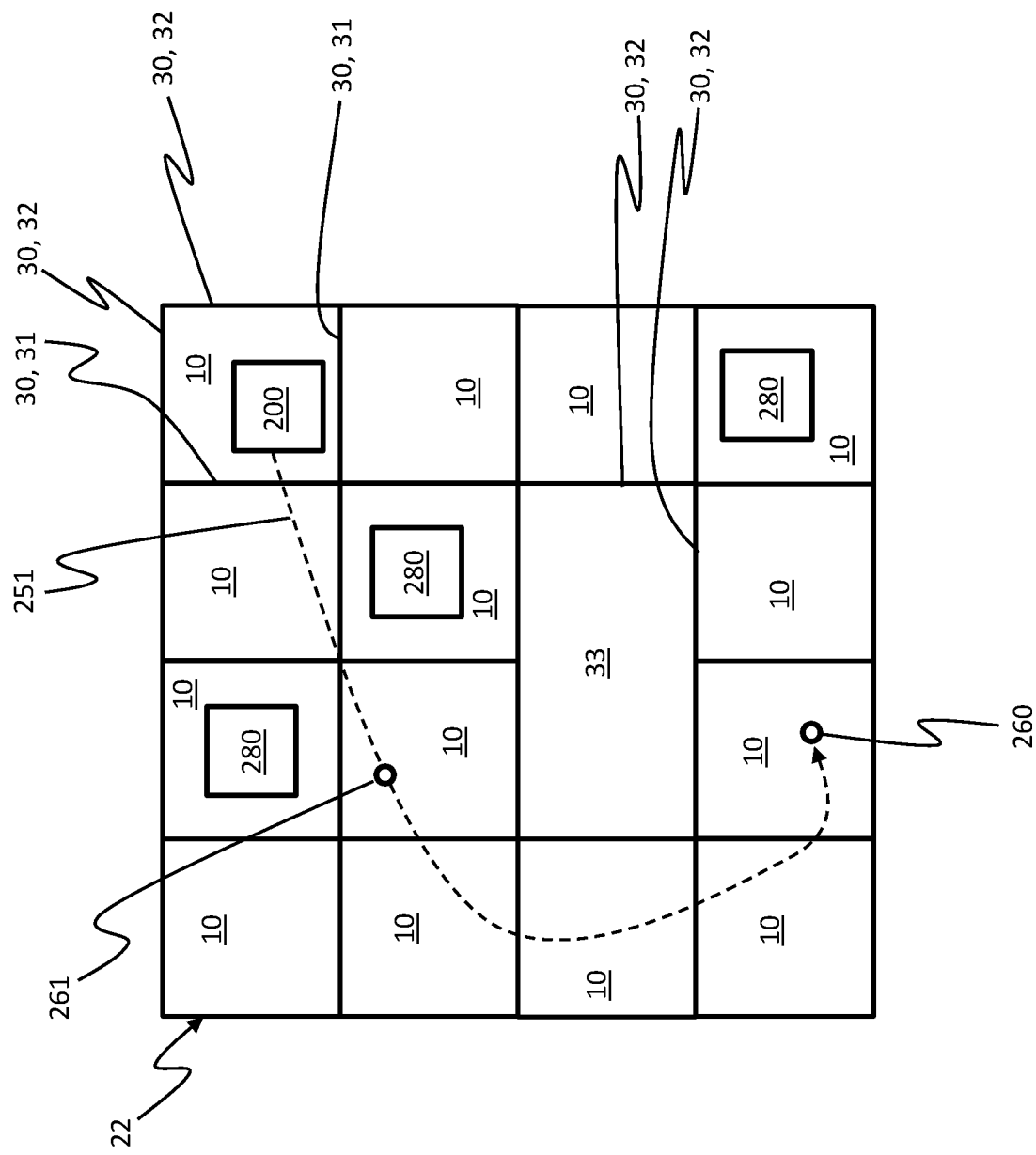
FIG. 12 shows a top view of a planar drive system.

FIG. 12 shows a drive surface 22 of a planar drive system in top view. The drive surface 22 is composed of a plurality of stator modules 10 as described for FIG. 2. A rotor 200 and three further rotors 280 are arranged on the drive surface 22, the further rotors 280 forming obstacles in the calculation of a virtual two-dimensional potential curve for the rotor 200 in analogy to FIG. 7. Based on the virtual two-dimensional potential curve, a movement path 251 to a target point 260 results in analogy to FIG. 7.

A free area 33 is arranged within the drive surface 22. The stator modules 10 and plate-shaped sectors defined by them each have four edges 30. The edges 30 are either inner edges 31 or outer edges 32. Further plate-shaped sectors or stator modules 10 are arranged at the inner edges 31. The outer edges 32, on the other hand, represent the edge of the drive surface 22 provided by the stator modules 10. A repulsive potential of the outer edges 32 is taken into account when determining the virtual two-dimensional potential curve. Thus, a movement of the rotor 200 over the edge of the drive surface 22 defined by the outer edges 32 may be prevented. The stator modules 10 adjacent to the free area 33 also have outer edges 32 at this location, which lead to a in a repulsive potential. The free area 33 is located between the rotor 200 and the target point 260. Due to the repulsive potentials of the outer edges 32, the path of movement 251 is guided around the free area 33.

Alternatively, the free area 33 may be considered as an obstacle when calculating the virtual two-dimensional potential curve.

In another embodiment, movements of the further rotors 280 on the drive surface 22 are taken into account when determining the virtual two-dimensional potential curve. On the one hand, this may be done if one or more of the further rotors 280 move, as well. For example, the method according to the invention may be carried out for all the rotors 200, 280 arranged on the drive surface 22.

It may be provided that the drive surface 22 shown in FIG. 12 represents only a section of a planar drive system. In particular, further stator modules 10 may be or are arranged adjacent to the drive surface 22, wherein outer edges 32 may thereby also become inner edges 31 if an additional stator module 10 is now arranged adjacent to a previous outer edge 32.

In another embodiment, an attractive potential of an intermediate target point 261 between the rotor 200 and the target point 260 may be considered. Such an optional intermediate target point 261 is also shown in FIG. 12. It may be provided that the attracting potential of the target point 260 is not considered in the determination of the virtual two-dimensional potential curve until the rotor 200 reaches the intermediate target point 261. Alternatively, attracting potentials of both the intermediate target point 261 and the target point 260 may be taken into account when determining the virtual two-dimensional potential curve.

Figure 13:
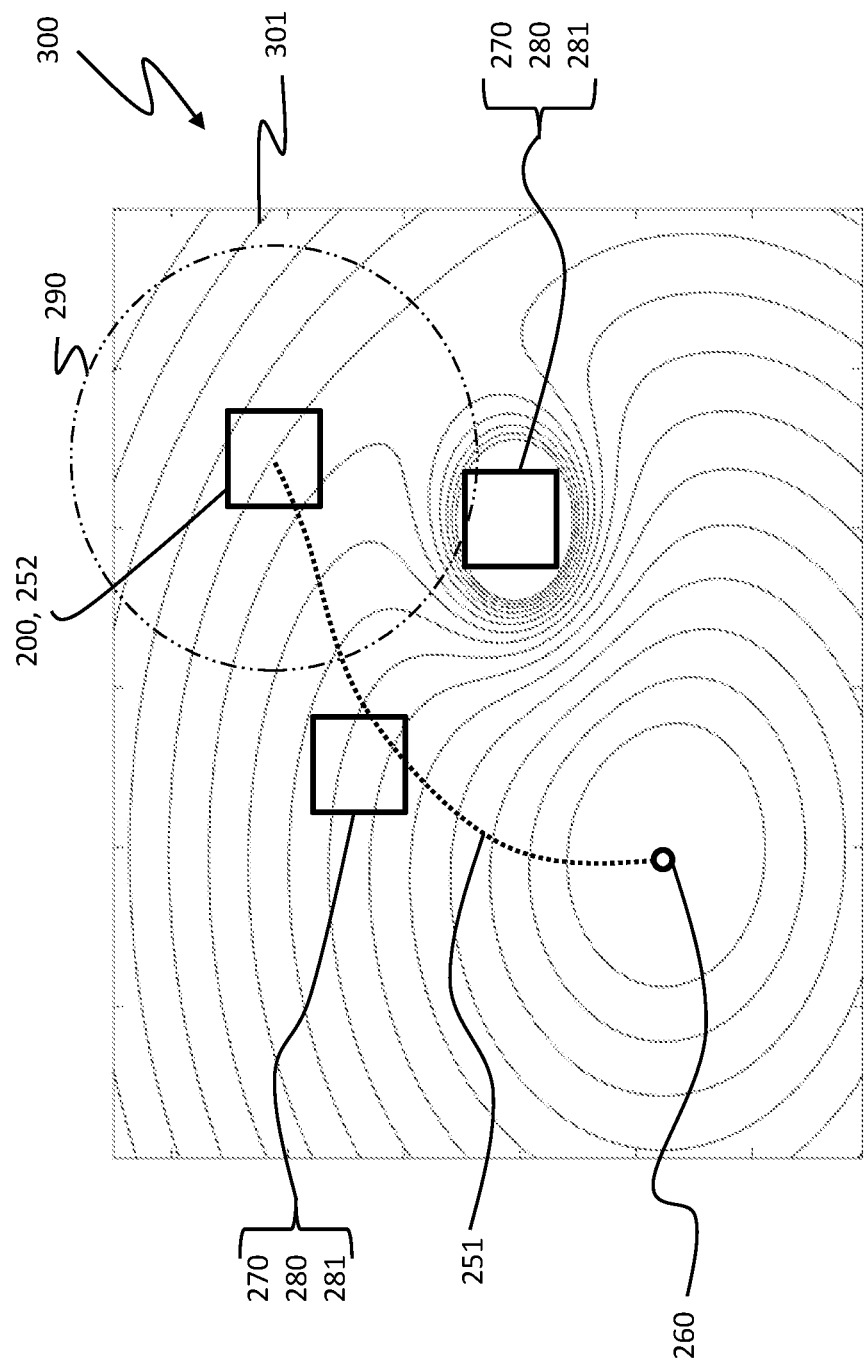
FIG. 13 shows a further virtual potential curve with a rotor, a target point and obstacles.

FIG. 13 shows a virtual two-dimensional potential curve 300 that corresponds to the virtual two-dimensional potential curve 300 of FIG. 7 unless differences are described below. In contrast to FIG. 7, a potential outside of a predetermined distance 290 from the rotor 200 is not taken into account when determining the virtual two-dimensional potential curve 300. One of the further rotors 280 is partially arranged within the predetermined distance 290, and therefore the repulsive potential of this further rotor 280 is taken into account when determining the virtual two-dimensional potential curve 300. The other further rotor 280 is arranged outside of the predetermined distance 290, which is why the repulsive potential of this further rotor 280 is disregarded when determining the virtual two-dimensional potential curve 300.

It may be seen from the virtual two-dimensional potential curve 300 of FIG. 13 that the attractive potential of the target point 260 is taken into account when determining the virtual two-dimensional potential curve 300.

The path of movement 251 of the rotor resulting from the virtual two-dimensional potential curve 300 as described for FIG. 7 would result in a collision with the further rotor 280 located outside the predetermined distance 290.

Figure 14:
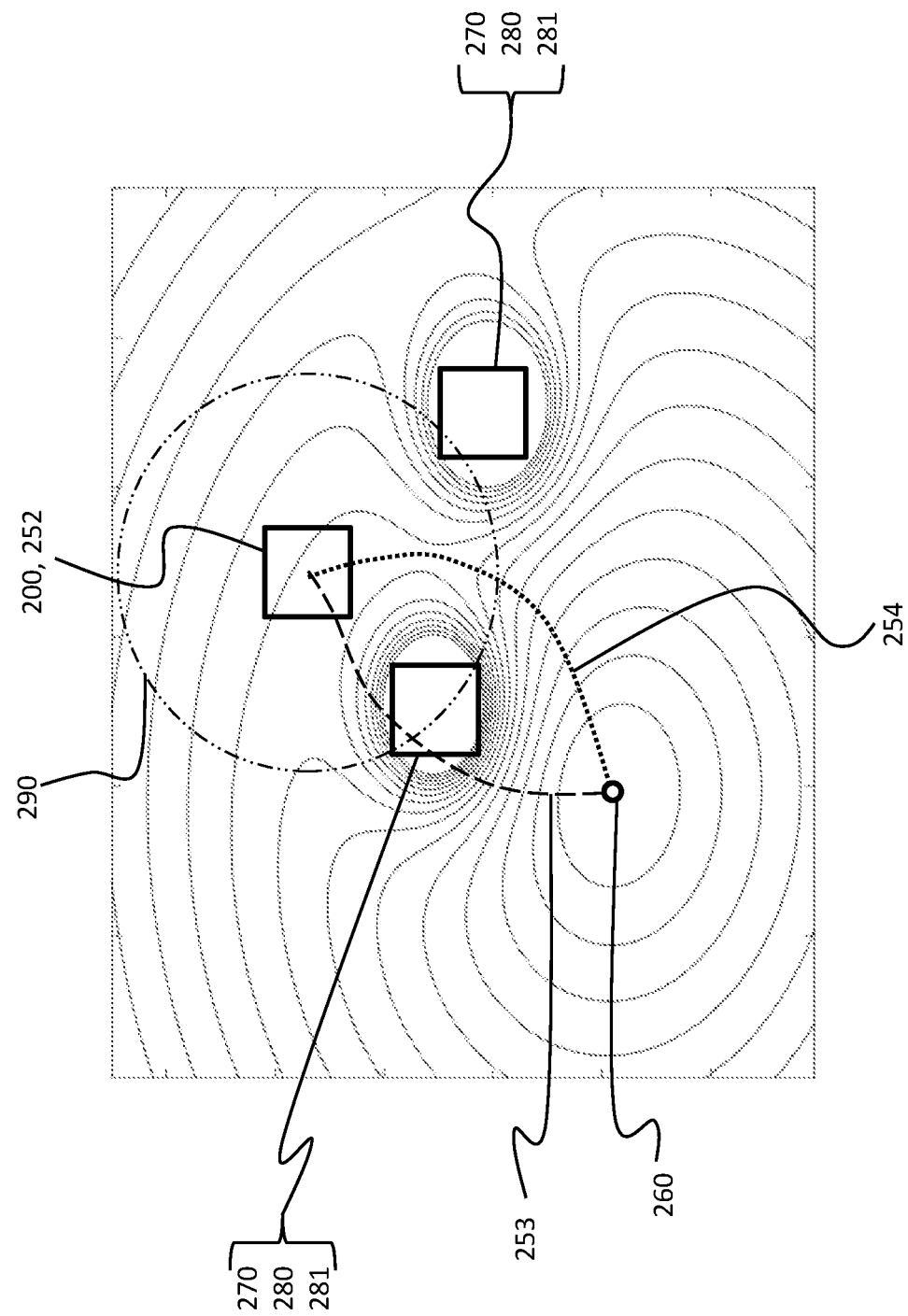
FIG. 14 shows the further virtual potential curve of FIG. 13 after the rotor has moved.

FIG. 14 shows a virtual two-dimensional potential curve 300 for the rotor 200 of FIG. 13 when it has moved a short distance along the path of movement 251 of FIG. 13. Now both further rotors 280 are within the predetermined distance 290, so that the repulsive potentials of both further rotors 280 are taken into account when determining the virtual two-dimensional potential curve 300. Based on the modified virtual two-dimensional potential curve 300, a new path of movement 254 is now obtained that leads between the further rotors 280 and avoids collisions with the further rotors 280. An original movement path 253 which corresponds to the movement path of FIG. 13 would lead to a collision with one of the further rotors 280.

In FIG. 14, it may also be seen that the further rotor 280, for which a collision would occur on the original path of movement 253 in FIGS. 13 and 14, has moved, as well, and has thus changed its further second position 281. This is also taken into account when determining the virtual two-dimensional potential curve 300.

Thus, after the arrangement of the rotor 200 and the further rotors 280 shown in FIG. 14 has been reached, the procedure is carried out again and the new path of movement 254 deviating from the path of movement 251 of FIG. 13 is determined. This could be done in the same way if the repulsive potentials of all further rotors 280 had already been taken into account when determining the virtual two-dimensional potential curve 300 of FIG. 13, for example in order to be able to take movements of the further rotors 280 into account when running through the method again.

It may be provided that an intermediate target point analogous to the intermediate target point of FIG. 12 is arranged within the predetermined distance 290 and is taken into account when determining the virtual two-dimensional potential curve 300.

The method described in FIGS. 7 to 14 may be carried out by the control unit 20 of FIGS. 1 and 2. For this purpose, the control unit 20 may have a computing unit that performs the necessary calculations. In addition, the control unit may have a means for exchanging data with the stator modules 10 of FIGS. 1 and 2 and for actuating of the conductor strips 125, 126 and thus the magnetic drive field of the stator modules 10.

Furthermore, a computer program is provided which comprises instructions which, when the computer program is executed by a computer, cause the computer to execute the steps of the described method. In particular, this computer program may be executed by the computing unit of the control unit 20. Alternatively, the computer program may be executed by another computing unit and only the results of the calculation may be transferred to the control unit 20, which enables the control unit 20 to control the stator modules 10 accordingly.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

| List of reference numerals |
|---|
| 1 planar drive system |
| 8 top side |
| 9 bottom side |
| 10 stator module |
| 11 stator surface |
| 12 first direction |
| 14 second direction |
| 15 vertical direction |
| 18 data connection line |
| 19 module housing |
| 20 control unit |
| 21 power supply line |
| 22 drive surface |
| 30 edge of stator surface |
| 31 inner edge |
| 32 outer edge |
| 33 free area |
| 100 stator assembly |
| 104 first stator layer |
| 105 second stator layer |
| 106 third stator layer |
| 107 fourth stator layer |
| 110 first stator sector |
| 112 third stator sector |
| 113 second stator sector |
| 114 fourth stator sector |
| 120 first stator segments |
| 121 second stator segments |
| 125 conductor strips |
| 126 further conductor strips |
| 127 magnetic field generator |
| 200 rotors |
| 201 magnet arrangement |
| 206 first rotor direction |
| 208 second rotor direction |
| 210 first magnet unit |
| 211 drive magnet |
| 220 second magnet unit |
| 221 further drive magnet |
| 230 third magnet unit |
| 240 fourth magnet unit |
| 250 virtual force vector |
| 251 path of movement |
| 252 first position |
| 253 original path of movement |
| 254 new path of movement |
| 260 target point |
| 261 intermediate target point |
| 270 obstacle |
| 271 second position |
| 280 further rotor |
| 281 further second position |
| 282 future further second positions |
| 290 predetermined distance |
| 300 virtual two-dimensional potential curve |
| 301 equipotential line |
| 321 first sectional line |
| 322 second sectional line |
| 323 third sectional line |
| 324 fourth sectional line |
| 325 location |
| 326 virtual potential course |

The invention claimed is:

1. A method for driving at least one rotor of a planar drive system, the rotor comprising at least a device or a magnet arrangement for generating a magnetic field, the rotor being movable on a drive surface, the drive surface being formed by stator modules, the stator modules having a magnetic field generator, and the method comprising the following steps:
   determining a virtual two-dimensional potential curve for the rotor, wherein a target point of the rotor has an attractive potential within the virtual two-dimensional potential curve;
   determining a virtual force vector at a first position of the rotor, the virtual force vector resulting from the virtual two-dimensional potential curve, the virtual force vector having a vector direction and a vector length; and
   controlling the magnetic field generator to generate a magnetic drive field that interacts with the magnetic field of the rotor such that a resulting force is applied to the rotor by interaction of the magnetic drive field with the magnetic field;
   wherein a direction of the resulting force is set based on the vector direction, and
   wherein a strength of the resulting force is set based on the vector length; and
   wherein the stator modules each have four edges, wherein the edges are either inner edges or outer edges, wherein further stator modules are adjacent to the inner edges, wherein the outer edges have a repulsive potential which is taken into account when determining the virtual two-dimensional potential curve.

2. The method according to claim 1, wherein at least one obstacle has a repulsive potential within the virtual two-dimensional potential curve.

3. The method according to claim 2, wherein the obstacle is another rotor.

4. The method according to claim 3, wherein the repulsive potential of the rotors is different and a rotor having a higher priority has a higher potential, the higher priority being indicative of which rotor is preferably to be moved toward its target point when the rotors move across the drive surface.

5. The method according to claim 1, wherein the virtual force vector is determined based on a two-dimensional derivative of the virtual two-dimensional potential curve.

6. The method according to claim 1, wherein a potential located outside of a predetermined distance from the rotor is disregarded when determining the virtual two-dimensional potential curve.

7. The method according to claim 6, wherein an attractive potential of the target point is also taken into account outside of the predetermined distance.

8. The method according to claim 7, wherein the target point is replaced with an intermediate target point when the target point is further from the rotor than the predetermined distance, the intermediate target point having an attractive potential.

9. The method according to claim 1, wherein a virtual compensation potential is taken into account in determining the virtual two-dimensional potential curve such that no local potential minima are present on a path of movement between the rotor and the target point.

10. The method according to claim 1, wherein a temperature of the stator modules is taken into account when determining the virtual two-dimensional potential curve.

11. The method according to claim 1, wherein a movement of a further rotor is predicted, and wherein a future further second position of the further rotor is also taken into account in determining the virtual two-dimensional potential curve after the movement has been performed.

12. A method for driving at least one rotor of a planar drive system, the rotor comprising at least a device or a magnet arrangement for generating a magnetic field, the rotor being movable on a drive surface, the drive surface being formed by stator modules, the stator modules having a magnetic field generator, with the method comprising the following steps:
   determining a virtual two-dimensional potential curve for the rotor, wherein a target point of the rotor has an attractive potential within the virtual two-dimensional potential curve;
   determining a virtual force vector at a first position of the rotor, the virtual force vector resulting from the virtual two-dimensional potential curve, the virtual force vector having a vector direction and a vector length; and
   controlling the magnetic field generator to generate a magnetic drive field that interacts with the magnetic field of the rotor such that a resulting force is applied to the rotor by interaction of the magnetic drive field with the magnetic field, wherein a direction of the resulting force is set based on the vector direction, and wherein a strength of the resulting force is set based on the vector length;
   wherein at least an obstacle has a repulsive potential within the virtual two-dimensional potential curve, wherein the obstacle is a further rotor,
   wherein the method is additionally carried out for the further rotor, wherein the repulsive potential of the rotors is different and the rotor with a higher priority has a higher potential, and
   wherein the higher priority is indicative of which rotor is to preferably be moved in the direction of its target point when moving the rotors across the drive surface.

13. The method according to claim 12, wherein the first position of the rotor is determined by sensors of the stator module.

14. The method according to claim 12, wherein a second position of the obstacle is determined using sensors of the stator module.

15. The method according to claim 12, wherein the repulsive potential of the rotor is taken into account when carrying out the method for the further rotor.

16. The method according to claim 12, wherein the virtual force vector is determined based on a two-dimensional derivative of the virtual two-dimensional potential curve.

17. The method of claim 12, wherein a movement of a further rotor is predicted, and wherein a future further second position of the further rotor is also taken into account in determining the virtual two-dimensional potential curve after the movement has been performed.

18. The method of claim 12, wherein the magnetic field generator comprises conductor strips, wherein the magnetic drive field is generated by energizing the conductor strips.

19. A planar drive system comprising:
   a control unit,
   a plurality of stator modules, and
   at least two rotors;
   wherein the stator modules comprise a magnetic field generator for generating a magnetic drive field,
   each rotor comprising at least a device or a magnet arrangement for generating a magnetic field,
   each rotor being movable on a drive surface, and
   the drive surface being formed by the stator modules;

wherein the control unit is configured to control the magnetic field generator to generate a magnetic drive field that interacts with the magnetic field of each rotor such that a resulting force is applied to the rotor by interaction of the magnetic drive field with the magnetic field, wherein a direction of the resulting force is set based on a vector direction, and wherein a strength of the resulting force is set based on a vector length;

wherein each rotor has a repulsive potential, wherein the repulsive potential of the two rotors is different and the rotor with a higher priority has a higher potential, and wherein the higher priority is indicative of which rotor is to preferably be moved in the direction of its target point when moving the two rotors across the drive surface.

* * * * *